(12) United States Patent
Schwander

(10) Patent No.: US 8,964,411 B2
(45) Date of Patent: Feb. 24, 2015

(54) METHOD FOR DC-DC CONVERSION USING A DC ELECTRIC POWER SOURCE

(75) Inventor: Denis Schwander, Labarthe sur Leze (FR)

(73) Assignee: Centre National d'Etudes Spatiales, Paris (FR)

( * ) Notice: Subject to any disclaimer, the term of this patent is extended or adjusted under 35 U.S.C. 154(b) by 287 days.

(21) Appl. No.: 13/511,977

(22) PCT Filed: Nov. 25, 2010

(86) PCT No.: PCT/FR2010/052529
§ 371 (c)(1),
(2), (4) Date: Aug. 24, 2012

(87) PCT Pub. No.: WO2011/067519
PCT Pub. Date: Jun. 9, 2011

(65) Prior Publication Data
US 2012/0314452 A1 Dec. 13, 2012

(30) Foreign Application Priority Data

Nov. 26, 2009 (FR) ...................................... 09 58392

(51) Int. Cl.
*H02M 3/335* (2006.01)

(52) U.S. Cl.
CPC ...... *H02M 3/33553* (2013.01); *H02M 3/33569* (2013.01)
USPC .......................................................... 363/16

(58) Field of Classification Search
USPC .................. 363/15–17, 89, 91, 125, 126, 127
See application file for complete search history.

(56) References Cited

U.S. PATENT DOCUMENTS

| 5,539,630 A | 7/1996 | Pietkiewicz et al. |
| 2007/0189043 A1* | 8/2007 | Lund et al. ...................... 363/17 |

FOREIGN PATENT DOCUMENTS

| EP | 0019096 A1 | 11/1980 |
| EP | 1406373 A2 | 4/2004 |
| JP | 2001275361 A | 10/2001 |
| JP | 2005168236 A | 6/2005 |

OTHER PUBLICATIONS

International search report for international application No. PCT/FR2010/052529 dated Apr. 27, 2011.

* cited by examiner

*Primary Examiner* — Adolf Berhane
*Assistant Examiner* — Afework Demisse
(74) *Attorney, Agent, or Firm* — Patterson & Sheridan, LLP

(57) ABSTRACT

The converter comprises an inverter powered by a DC current source. The inverter powers a conversion unit operating on the basis of controlled magnetic switching obtained by means of power diodes and saturable inductors. A regulator can be used to produce a control voltage that is a function of the output voltage which is regulated with the injection of the control voltage into the circuit comprising the smoothing inductors. According to the invention, during each operating cycle, one of the power diodes is locked when the other power diode switches to conduction mode, such as to create a phase displacement between the input voltage of the conversion unit and the input current of same. The phase displacement angle is a function of the control voltage.

26 Claims, 16 Drawing Sheets

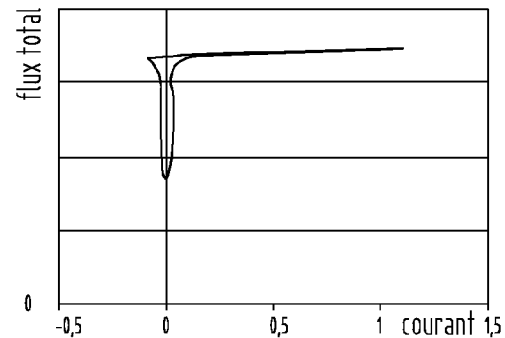
FIG.6
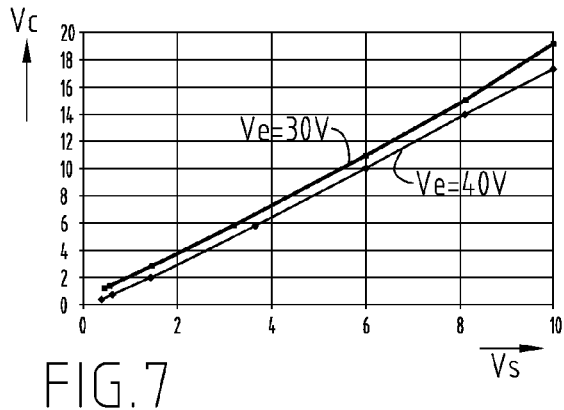
FIG.7
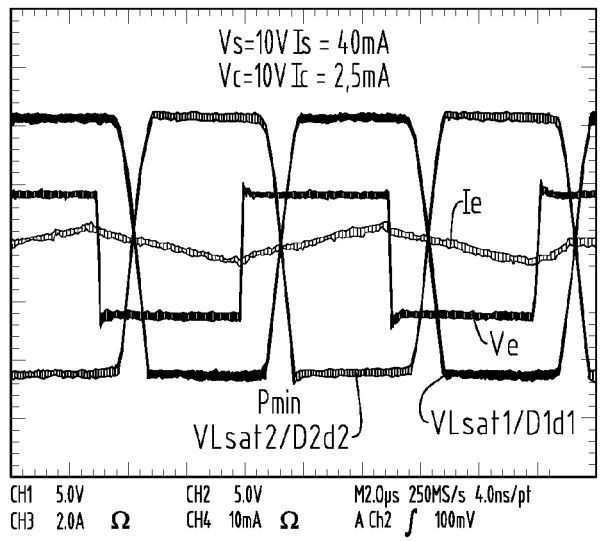
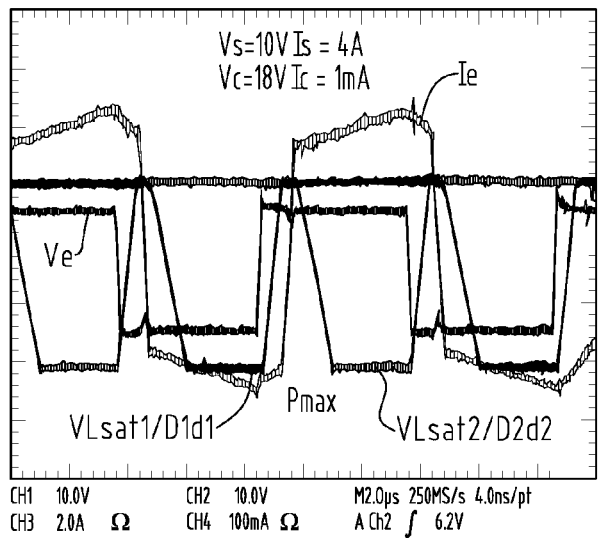
FIG.8

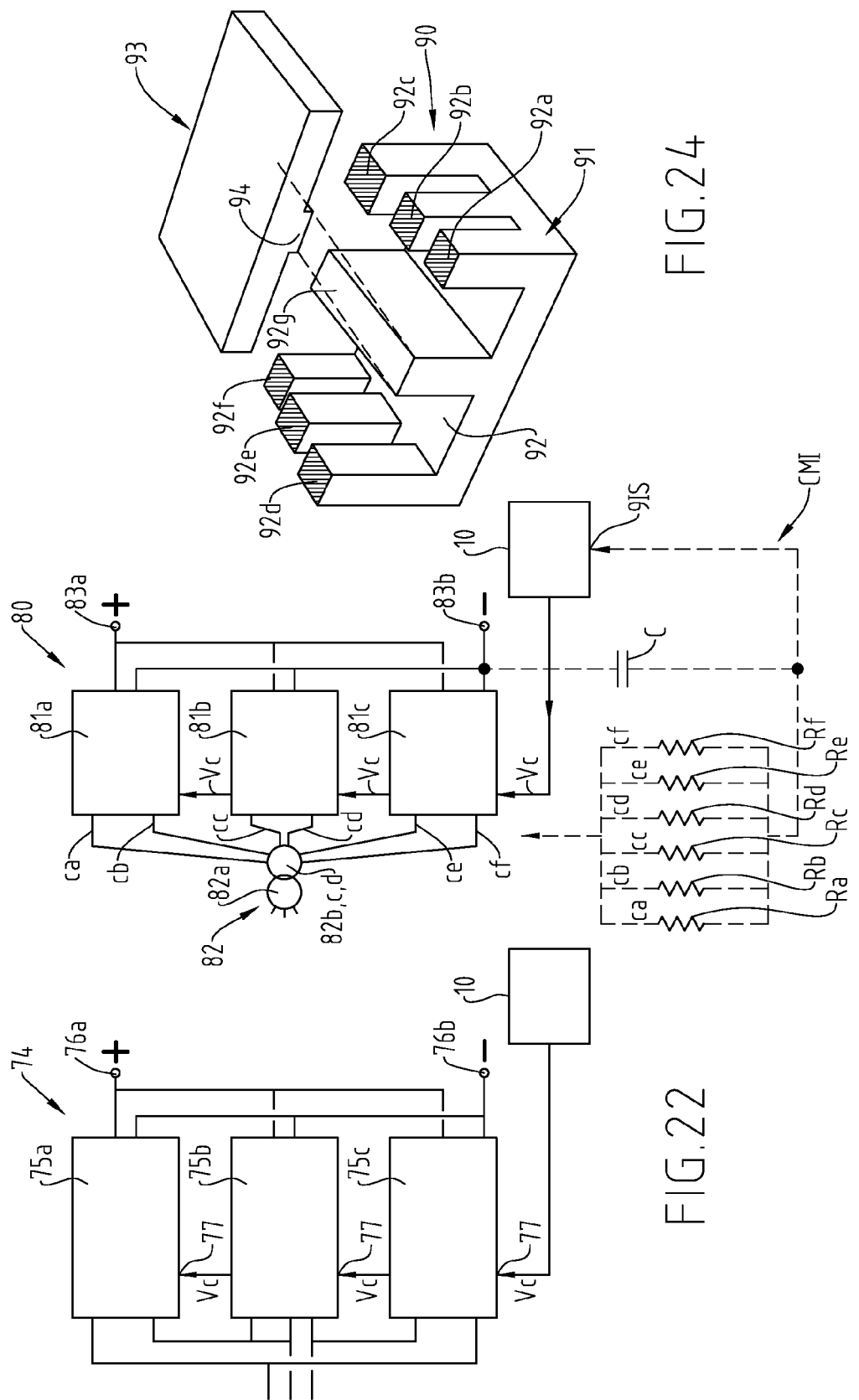

METHOD FOR DC-DC CONVERSION USING A DC ELECTRIC POWER SOURCE

The invention relates to a method for converting electricity provided by a direct voltage and current power source having first respective values into electricity with a direct output voltage and current having second respective values. The invention also relates to a DC-DC converter for implementing this method as well as a facility including several such converters.

DC-DC converters intended to provide strong currents at low voltages are already known the state of the art. They are in particular used to power satellites and other similar electricity-consuming devices and often comprise a magnetic regulating device called "magnetic postregulator" by specialists, provided to ensure switching of the current so as to deliver an output current with a regulated voltage and/or current.

In a technical bulletin no. SR-4, published in 1999 by the Company Magnetics, Butler, Pa. 16003, EUA, a DC-DC converter with a magnetic postregulator is described (see FIG. 1 of the appended drawings). It includes an input transducer T receiving, on its primary, a hashed direct current from a direct current source (not shown). The secondary of this transducer powers, by its respective ends, two saturable induction coils SC1 and SC2 connected using diodes D1 and D2 to a smoothing induction coil L also connected to the positive output terminal B+ of the converter.

The negative output terminal B− is connected to a middle connector PM of the transducer T. A regulator R producing a voltage reference on a reference point PR injects a correction signal on a line LC in the rectifier circuit CR formed by the induction coils SC1 and SC2 and the diodes D1 and D2 by means of two additional diodes d1 and d2 that are respectively connected to the junction points between the induction coil SC1 and the diode D1 on the one hand and the induction coil SC2 and the diode D2 on the other.

The assembly also includes a "free wheel" diode D3 connected between the node of the diode D1 and the induction coil L and the negative output terminal B− of the converter.

This known converter with a magnetic postregulator works suitably by switching due to the saturation of the induction coils SC1 and SC2, but has the drawback of requiring a transducer T with a relatively complex construction, as it is equipped with a secondary made up of two half-windings, and above all a "free wheel" diode D3. The latter introduces switching energy dissipation related to the charges accumulated by its parasitic capacity. Furthermore, the regulator R is intended to control the output voltage through a modification of the cyclic ratio of the switching done in the converter.

Known from Japanese patent JP2001 275 361 is another type of DC/DC converter, an overview diagram of which is shown in FIG. 2 of the appended drawings. In that case, an input transducer Ta is used whereof the secondary does not comprise a middle connector. This secondary powers two saturable induction coils SC1a and SC2a that are connected to a positive output terminal Ba+ by means of respective transistors TR1 and TR2. The terminals of the secondary of the transducer Ta are also connected to smoothing inductors La and Lb whereof the shared node is connected to the negative output terminal Ba− of the converter. The gates of the transistors TR1 and TR2 are respectively connected to switching control circuits CC1 to CC4 that receive their input signals from the terminals of the secondary.

This known converter constitutes a current doubler with a synchronous rectifier and uses active components to obtain the switching. The saturable induction coils SC1a and SC2a here serve to perform, by compensating spikes, gentle switching of the active components without themselves participating in the determination of the switching. Furthermore, the output voltage is equal to half the output voltage of the transducer Ta and this ratio is fixed and not regulated. This therefore involves a converter which, although having an input transducer with a single secondary, requires the use of active components and their control circuits such that this converter is ultimately more complex than that of the prior art document previously analyzed. Furthermore, in considering the preferred field of application of the present invention, the presence of active components introduces an operating insecurity factor due to the risks of breakdown that are inherent to the use of such components. The assembly is therefore less suitable for use in an application requiring faultless reliability, for example as a power supply for a satellite.

The invention aims to provide a method for converting electricity as well as a DC/DC converter with a regulated output implementing this method and provided without active components and a "free wheel" diode and in certain cases, a transducer with a divided secondary. The invention also aims to provide an electricity distribution facility including several of these converters.

The invention therefore primarily relates to a method for converting the electricity provided by an energy source delivering a first direct voltage and a first direct current having first respective values into output electricity at a second direct voltage and a second direct current having second respective values, the method consisting of a) subjecting the first current to an inversion operation to form a third alternating current at a third voltage, said third current at said third voltage being mono- or polyphase, b) changing, through a conversion operation, the value of said third voltage, or the value of each phase thereof, to obtain at least one converted voltage having said second value while simultaneously, the current at said converted voltage is rectified in at least one conversion unit while being subjected to magnetic switching using first and second saturable induction coils, c) said saturable induction coils being connected in a serial rectifying current made up of said first saturable induction coil, first and second head-to-tail power diodes and the second of the saturable induction coils, the two power diodes being shunted by two head-to-tail regulating diodes with rectification directions opposite those of the two power diodes, d) said serial circuit being connected to receive said converted voltage and to deliver said electricity in the form of at least part of said second direct current, the method also consisting of e) regulating, during each cycle of the converted voltage, the moments of the magnetic switching by injecting, through said regulating diodes, a control voltage created as a function of the variations of said second voltage, and f) controlling, for a first portion of each of said cycles, under the effect of the saturation of said first saturable induction coil, the conduction of said first power diode, and controlling, for a second portion of each concerned cycle, under the effect of the saturation of said second saturable induction coil, the conduction of said second power diode, the saturation moments being determined during that cycle as a function of said control voltage, said method being characterized in that g) it also consists, during said first portion of said cycle, of blocking said second power diode by conducting said first power diode, and during said second portion of the considered cycle, of blocking said first power diode by conducting said second power diode, so as to create a phase shift between said third voltage and said third current or between the voltage and the current of each phase thereof, the phase shift angle depending on said control voltage, and in that the method steps b), e), f) and g) are carried out, if applicable, for each phase of said third voltage.

Owing to these features, it becomes possible to design DC-DC converters without "free wheel" diodes or switching transistors, while having a completely controlled stable operation.

According to other advantageous features, the method according to the invention may also consist of smoothing said rectified current using at least one pair of smoothing induction coils in series connected on said converted voltage, said second voltage being taken from the node between said power diodes and the node between said smoothing induction coils of one pair;

determining said control voltage as a function of said at least one portion of the second current;

said control voltage is determined as a function of an image of said second current taken either from the filtered average of two voltages respectively taken between the terminals of said saturable induction coils opposite the terminals that are connected to said power diodes, and a reference point shared by the second voltage and said control voltage, in the monophase case, or from the set of filtered averages of these voltages in all of the phases, in the polyphase case;

determining said control voltage from an image of said second current of form Vc/k-Vs, Vc being said third voltage, k being a constant comprised between 1 and 3, and Vs being said second voltage;

referencing said control voltage relative to the positive potential of said second voltage;

referencing said control voltage relative to the negative potential of said second voltage.

The invention also relates to a DC-DC converter for implementing the method as defined above in the form of its various embodiments.

Thus, according to a first embodiment, the DC-DC converter can include an inverter, a conversion unit and a regulator, said conversion unit including a transducer comprising a primary connected to said inverter and a secondary whereof the ends are connected to a serial circuit made up of a first saturable induction coil, two head-to-tail power diodes and a second saturable induction coil, the two power diodes being shunted by two head-to-tail regulating diodes with rectification directions opposite those of the two power diodes, said conversion unit also including a second serial circuit formed from two smoothing induction coils and connected in parallel to said secondary of said transducer, said second voltage being taken between the shared node of said power diodes and the shared node of said smoothing induction coils, and said control voltage produced by said regulator being applied between the shared node of said regulating diodes and the shared node of said smoothing induction coils.

According to another embodiment, the DC-DC converter can include an inverter, a conversion unit and a regulator, said conversion unit including a transducer comprising a primary connected to said inverter and a secondary whereof the ends are connected to a first serial circuit made up of a first saturable induction coil, two head-to-tail power diodes and a second saturable induction coil, the two power diodes being shunted by two head-to-tail regulating diodes with rectification directions opposite those of the two power diodes, the secondary of said transducer being made up of two half-windings that have a weak magnetic coupling between them and which are coupled, preferably strongly, respectively each to half of the primary winding of said transducer, in return for which said half-windings respectively serve both as half-secondary for the conversion and smoothing induction coil, said second voltage being taken between the shared node of said power diodes and the shared node of said half-windings of said transducer, and said control voltage produced by said regulator being applied between the shared node of said regulating diodes and the shared node between said power diodes.

According to a third embodiment, the DC-DC converter can also include an inverter, a conversion unit and a regulator, said conversion unit including a transducer comprising a primary connected to said inverter and made up of two primary half-windings connected in series and a secondary made up of two half-windings also connected in series, the half-windings of the primary respectively forming, with the half-windings of the secondary, pairs each made up of a primary half-winding and a secondary half-winding that are closely coupled to one another, said primary being connected to said inverter and said secondary being connected to a serial circuit made up of a first saturable induction coil, two head-to-tail power diodes and a second saturable induction coil, the two power diodes being shunted by two head-to-tail regulating diodes with rectification directions opposite those of the two power diodes, said converter also including a single smoothing induction coil connected between the shared node of said secondary half-windings and an output terminal of said conversion unit supporting the negative potential of said second voltage, the output terminal of said unit supporting the positive potential thereof being connected to the shared node of said power diodes, and said control voltage produced by said regulator being applied between the shared node of said regulating diodes and said output terminal of the conversion unit supporting said negative potential.

In the context of the first embodiment defined above, said smoothing induction coils include a shared magnetic circuit on which their respective windings are wound, said magnetic circuit having an air gap associated in common with the two smoothing induction coils, said windings having a low coupling with one another ensured only through said magnetic circuit, the winding direction of the two windings being such that the flows they create in the magnetic circuit and which are due to the direct current components, pass through said air gap in the same direction.

In the context of the second embodiment described above, the primary of said transducer is wound on two distinct elementary magnetic circuits to form said two primary half-windings connected in series, each of these half-windings being strongly coupled together with a respective half-winding of the secondary of the transducer on an elementary magnetic circuit. In this case, each of said elementary magnetic circuits can be made in the shape of a C thereby forming an air gap, or in the form of a toroid.

According to one advantageous arrangement of the first embodiment, the windings of said smoothing induction coils also make up the secondaries of said transducer, and each of these windings is wound together on said magnetic circuit tightly, with half of a winding of said transducer, said two winding halves forming the primary thereof.

In the context of the third embodiment of the invention, it may be advantageous to provide said transducer with a magnetic circuit on which two distinct sets of half-windings are wound located in different places on the magnetic circuit of the transducer and each made up of a primary half-winding and a secondary half-winding, the half-windings of each set being wound with a tight coupling. Furthermore, the single induction coil can advantageously have a toroid-shaped magnetic circuit.

Furthermore, it should be noted that in all of the cases defined above, the magnetic circuits can be ring-shaped.

The invention also relates to several embodiments of an electricity distribution facility, in particular for satellites, designed to implement the method as defined above through various combinations of its features.

Thus, according to a first embodiment of such a facility, it includes a DC-DC converter as defined above and built with a plurality of conversion units, said conversion units being distributed in groups of at least three units and the conversion units of each of said groups being connected to said inverter by a shared multi-line cable.

According to a second embodiment of the facility, it includes a polyphase inverter, a plurality of conversion units, said conversion units being distributed in at least one group of at least three units and, associated with each group, a regulator to perform said regulation operation, each conversion unit of a group of units including a transducer to perform said conversion operation of said third voltage, the transducers of the units of a group being connected to said inverter by means of a multi-line cable, said regulator applying the same control voltage to the units of a group, and in a group of conversion units, the outlets thereof are connected in parallel to provide, on two output terminals of that group, the sum of their individual output currents as second output current.

In that case, in each of said groups of conversion units, they can be connected in a triangle or star.

According to a third embodiment, the facility includes a polyphase inverter, a plurality of conversion units, said conversion units being distributed in at least one group of at least three units, and, associated with each group, a regulator for performing said regulating operation, and for performing said conversion operation of said third voltage, the conversion units of one group of units are associated with a shared transducer with a polyphase primary and having as many secondaries as there are conversion units in the group, this transducer being connected to said inverter by means of a multi-line cable, said regulator applying the same control voltage to the units of a group, and in a group of conversion units, the outputs thereof are connected in parallel to provide, on two output terminals of that group, the sum of their individual output currents as second output current.

When, in that case, smoothing induction coils are provided, those belonging to the conversion units of a same group of conversion units can advantageously be grouped together on a shared magnetic circuit on which their respective windings are wound, this magnetic circuit having a single air gap, the coupling of these windings to one another being ensured only through said shared magnetic circuit, the winding direction of said windings being such that the flows due to the direct current components that pass through these windings pass through said air gap in the same direction.

In this last alternative of the facility, advantageously, in each group of conversion units, the smoothing induction coils grouped together on said shared magnetic circuit can respectively also serve as secondaries of said single transducer whereof the primary windings are respectively divided into two half-windings each coupled to one of the secondary windings also serving as smoothing induction coils for the conversion unit to which they are connected.

According to another embodiment of the invention, it may include at least one converter built with a plurality of conversion units powered by a shared transducer including a plurality of secondaries at a rate of one per unit. Each of these conversion units can then be provided with its own regulator.

According to still another embodiment of the facility, it can include a converter built with a plurality of conversion units arranged in at least one group of conversion units powered by means of a shared transducer connected by its primary to said inverter and including as many secondaries as there are conversion units in a group, one of said conversion units of a group being able to be a pilot conversion unit formed by a mono-alternation rectifier with no phase shift means, said inverter being adjustable, and an adjustment loop may be provided acting on said inverter to adjust it as a function of the difference signal between a voltage reference signal and a signal depending on the output voltage of said pilot conversion unit, the other conversion units of a group then being provided with their own regulator.

The invention is described in more detail relative to example embodiments and in reference to the drawings.

FIGS. 1 and 2, already described, show DC/DC converter diagrams of the state of the art;

FIG. 6 shows an example of one possible curve of the flow as a function of the current characterizing an example of a saturable induction coil that can be used in the conversion unit according to the invention;

FIG. 7 shows curves of the control voltage as a function of the output voltage of a conversion unit according to the invention so as to illustrate the current limiting operation thereof;

FIG. 8 shows a diagram illustrating the operation of the conversion unit under two different power ratings;

FIG. 22 is a partial diagram of an electricity distribution facility of the type shown in FIG. 21, only one group of which is shown here, the conversion units of each group of units of the converter being mounted in a triangle;

Figure 14:
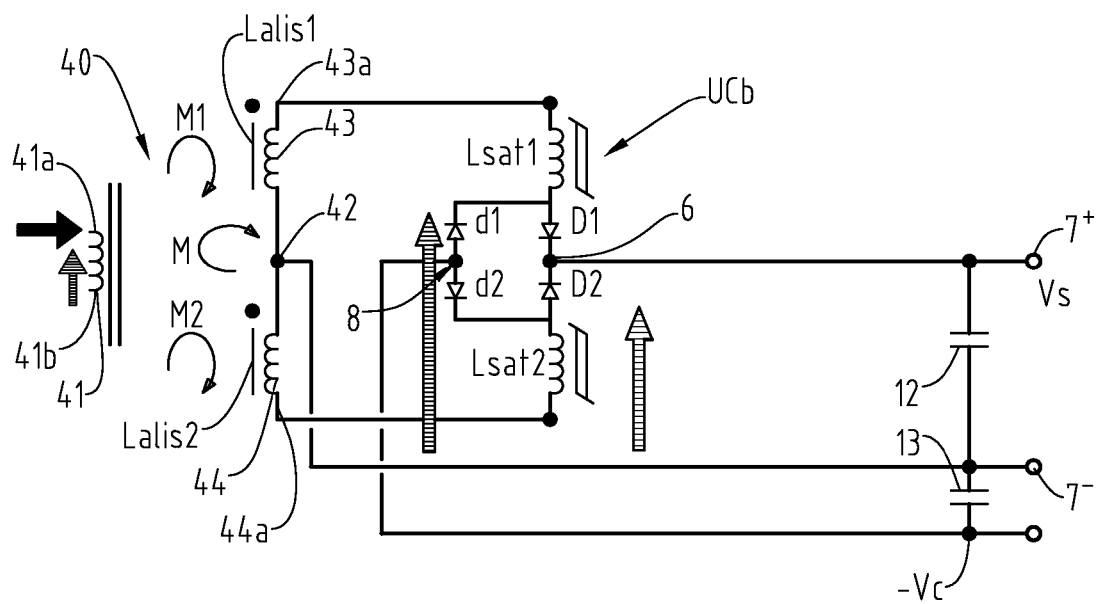
FIG. 14 shows a diagram of a conversion unit according to the invention in which smoothing induction coils are used combined with secondary windings of a transducer.
Figure 21:
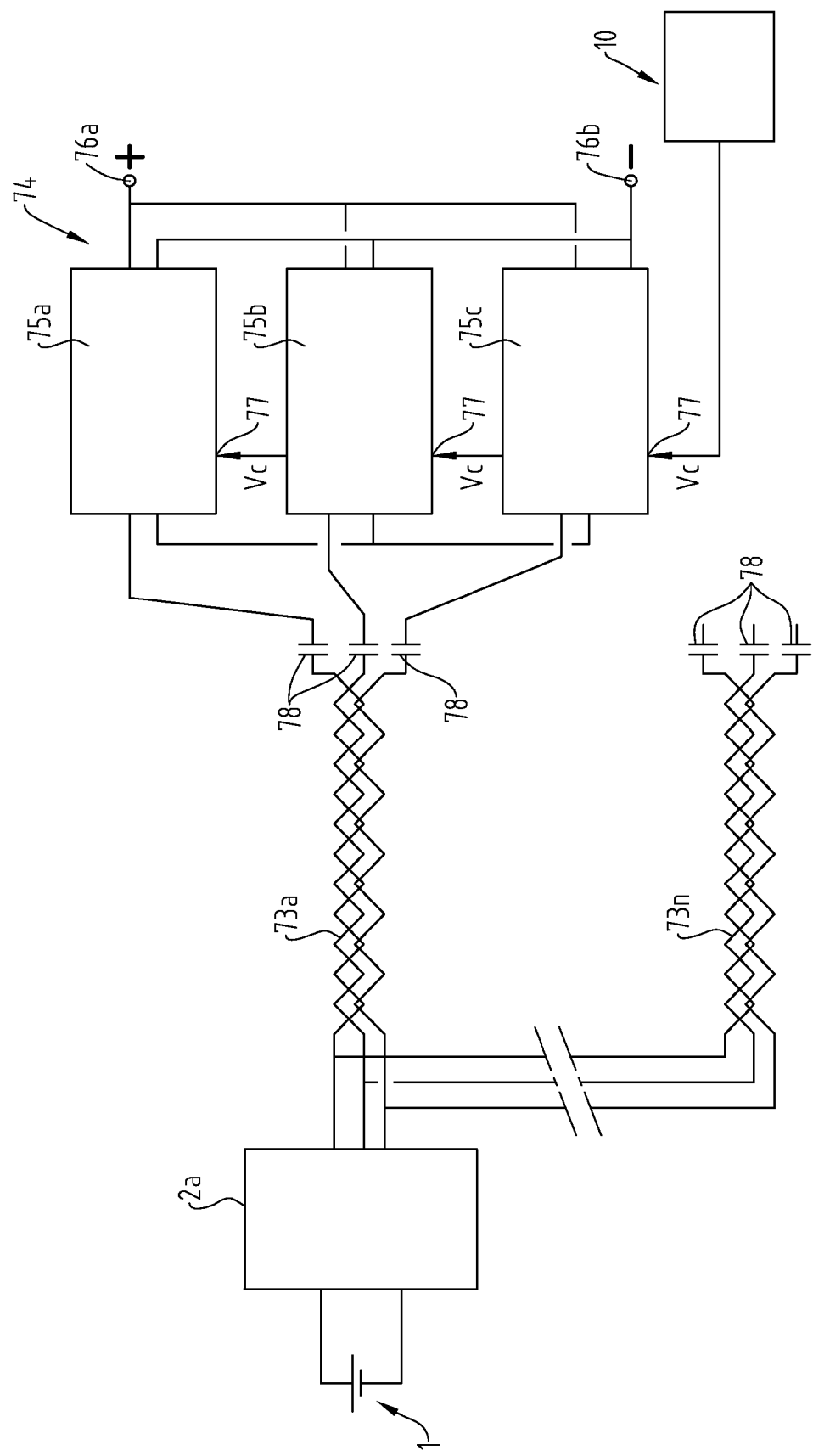
FIG. 21 is a diagram similar to that of FIG. 20 and shows an electricity distribution facility in which the converter includes a three-phase inverter powering a plurality of groups of conversion units connected according to a three-phase diagram, here in a star.
Figures 25, 26:
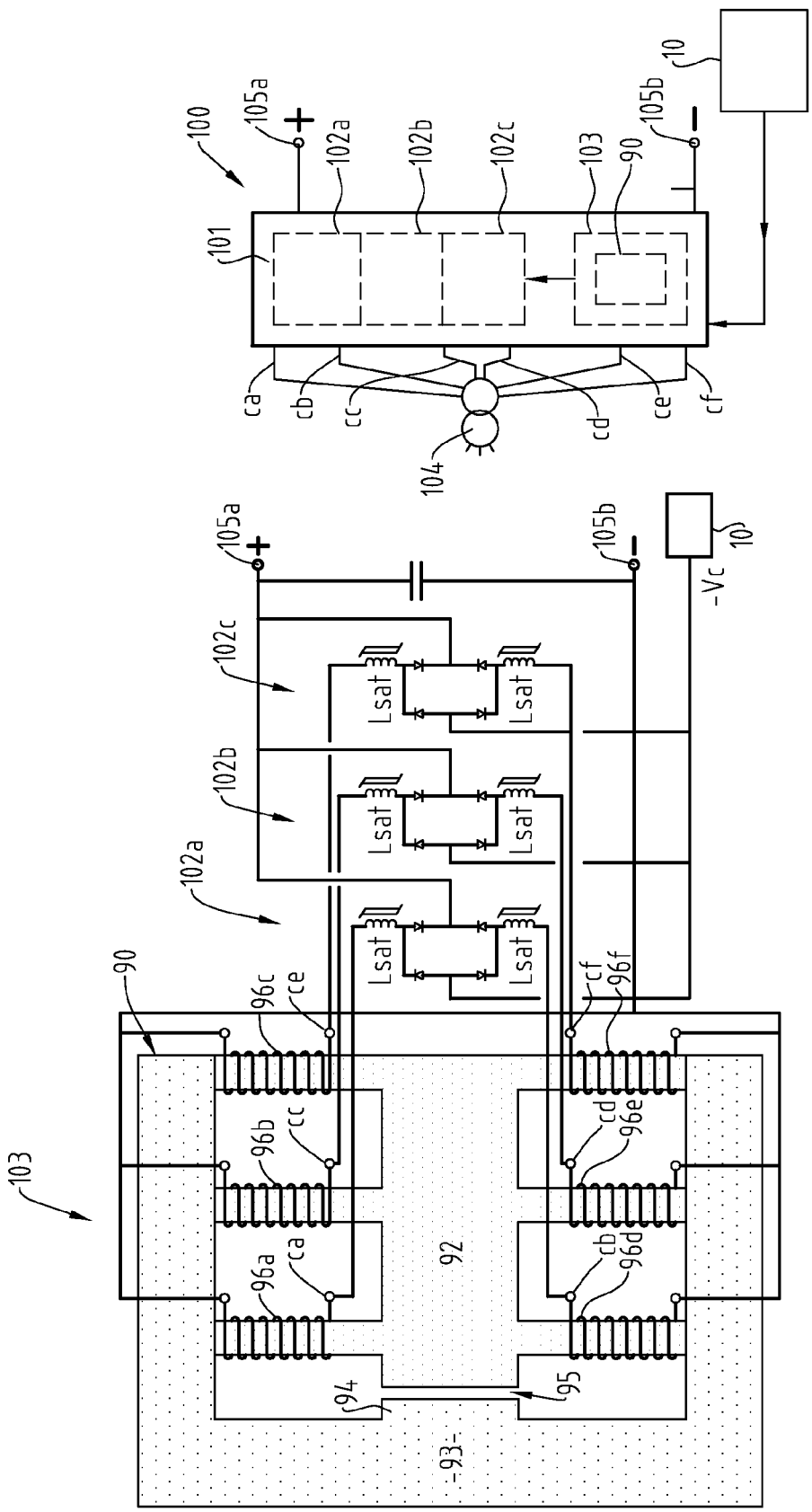
Figure 27:
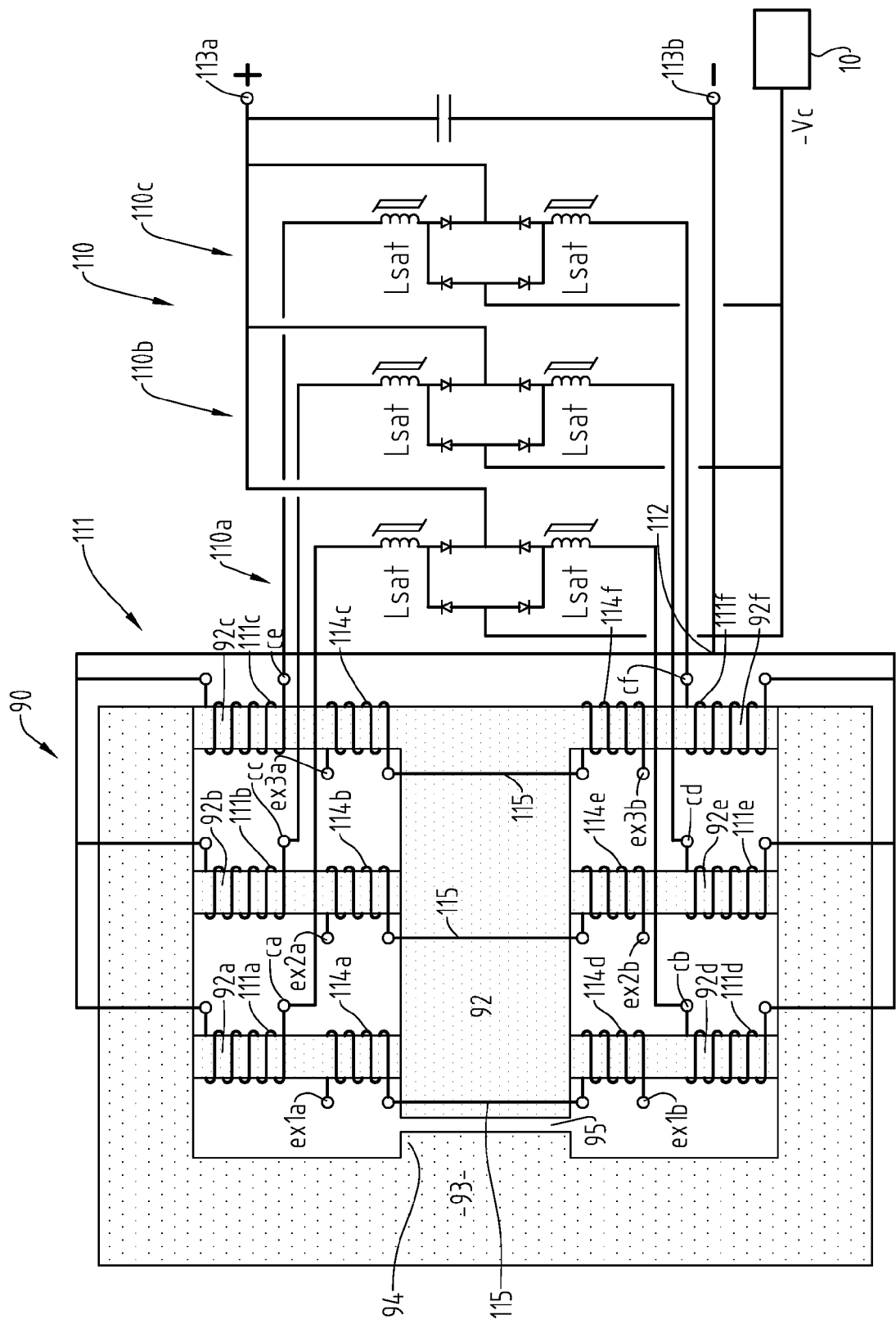
Figure 28:
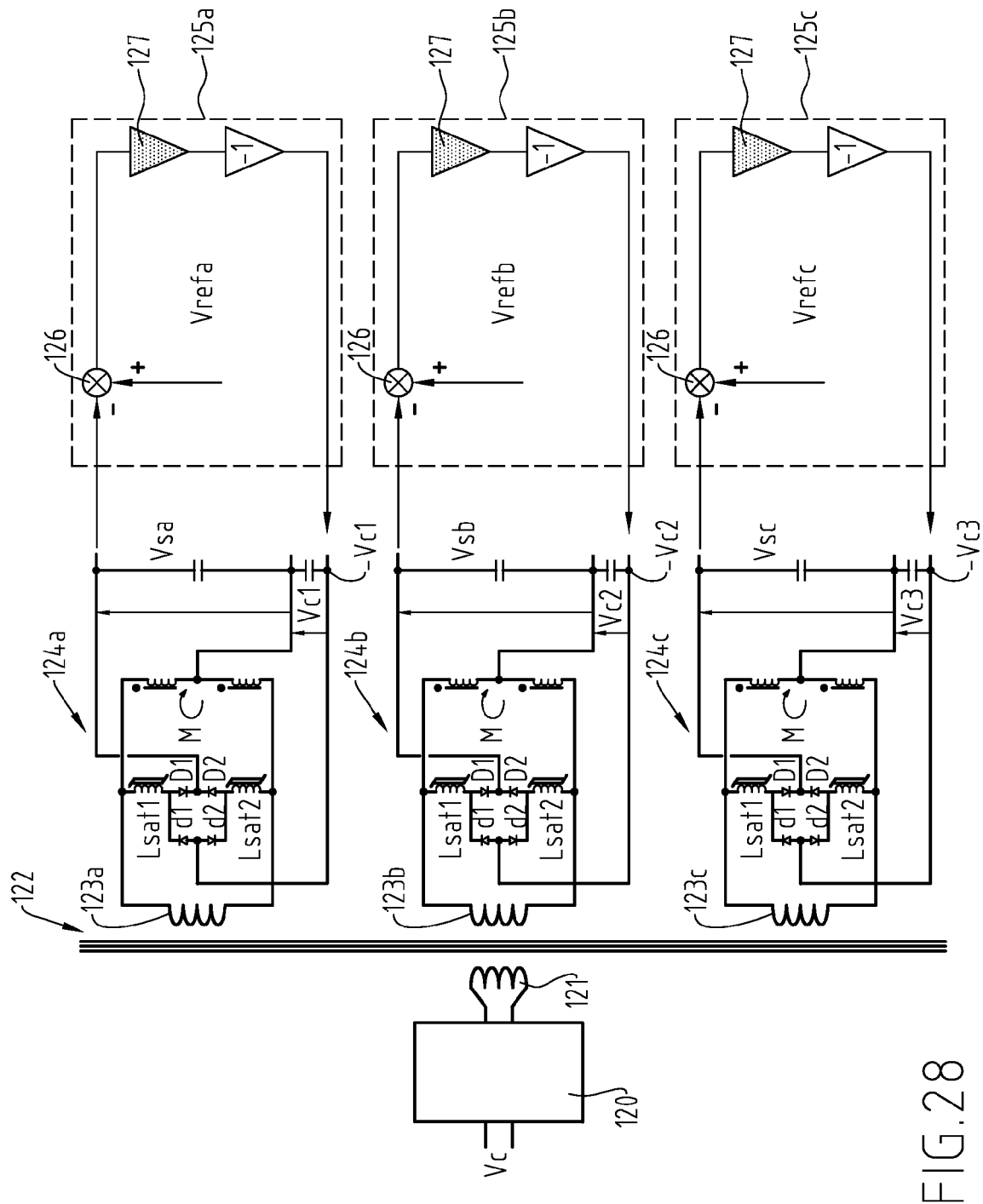
Figure 29:
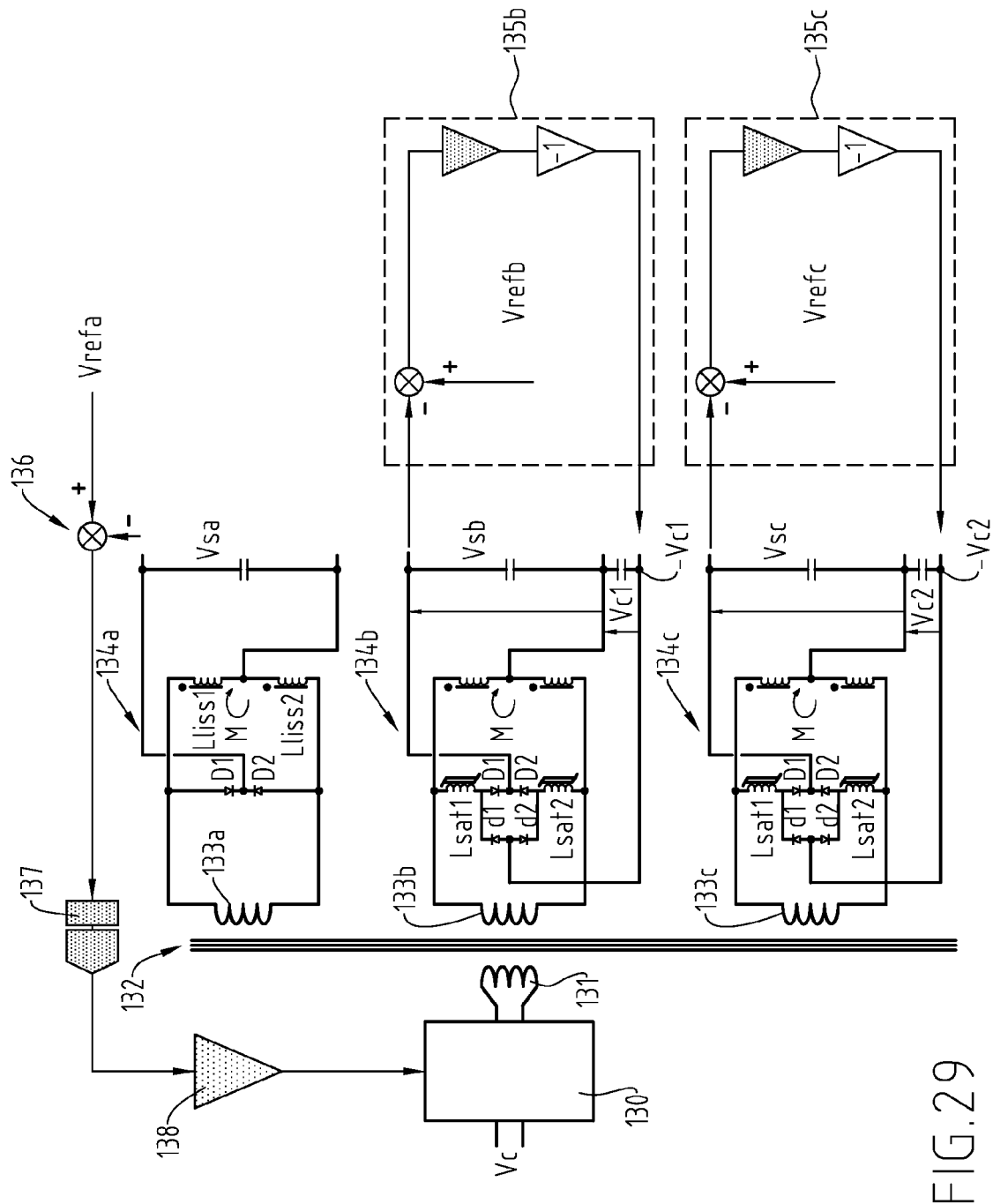

FIG. 23 is a partial diagram of an electricity distribution facility including conversion units whereof the diagram is generally similar to that of the units shown in FIGS. 21 and 22, but for which, in each group of conversion units, only a single shared transducer is provided for those units, the part of the figure in broken lines illustrating a simple optional means for measuring the output current of the assembly;

FIG. 24 is a diagrammatic perspective view of a magnetic circuit that can advantageously be used to produce smoothing induction coils of the conversion units, when they are grouped in threes;

FIG. 25 shows a winding diagram of the magnetic circuit of FIG. 24 in the case where the latter is applied to produce smoothing induction coils in conversion units grouped together in threes;

FIG. 26 is a simplified diagram of a conversion group using the winding diagram according to FIG. 25;

FIG. 27 is a winding diagram of a conversion group including three conversion units designed according to the unit of FIG. 14 and in which the magnetic circuit of FIG. 24 is used, which in that case also receives the primary conversion windings cooperating with the windings of the smoothing induction coils forming conversion secondaries at the same time;

FIGS. 28 and 29 are converter diagrams in which different principles for regulating the output voltage of the conversion units are provided.

Figure 1:
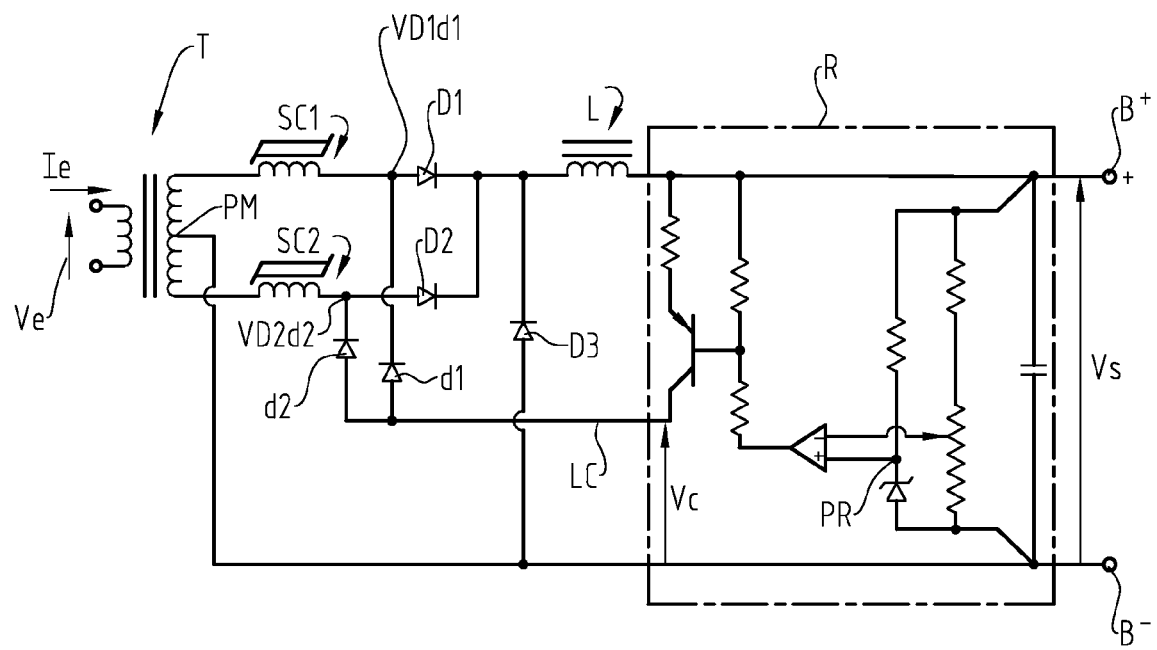
Figure 2:
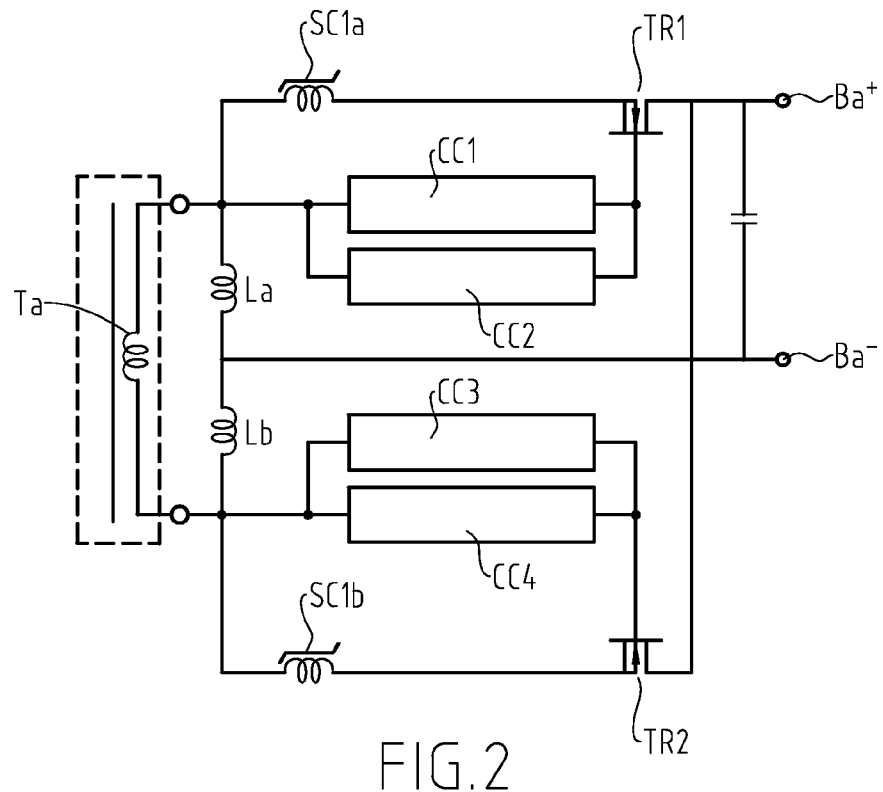
Figure 3:
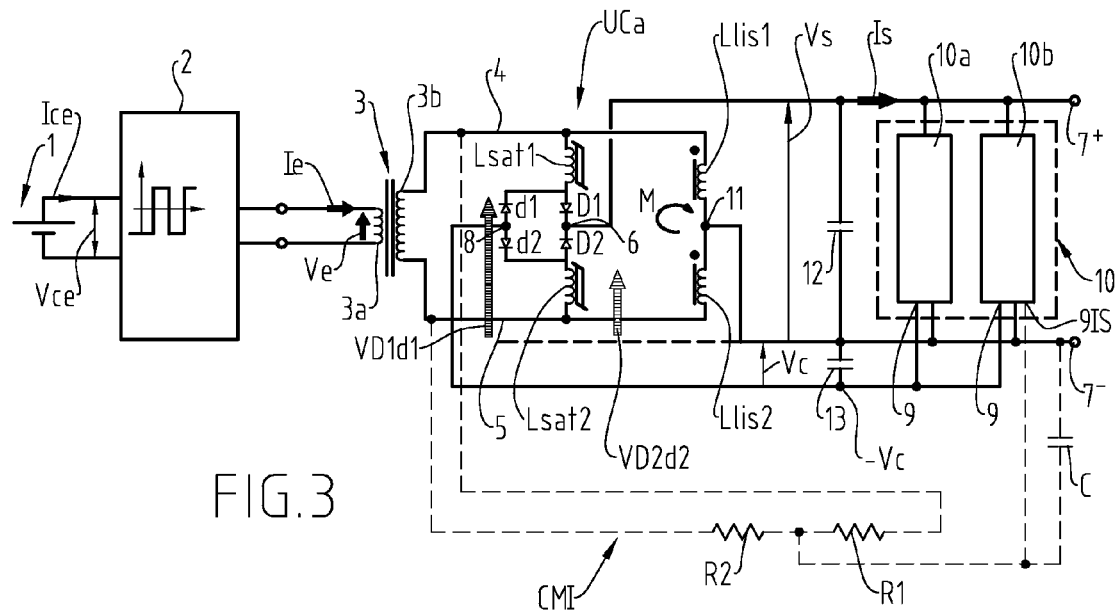
FIG. 3 shows a diagram of one preferred embodiment of the DC/DC converter according to the invention, the part of the figure in broken lines representing a simple optional means for measuring the output current of the converter.

Reference will first be made to FIG. 3, which shows the preferred embodiment in which the method according the invention is implemented. In this case, the DC/DC converter is powered from a direct current source 1, for example the primary power bar of a telecommunications satellite. This source 1, which provides a DC DC input current Ice at a direct input voltage Vice, powers a symmetrical voltage inverter 2 whereof the output is connected to an AC-DC conversion unit UCa sometimes called "symmetrical postregulator" by specialists. This conversion unit UCa includes a transducer 3 equipped with a primary 3$a$ and a secondary 3$b$ formed by a single winding. In the example, the ratio between the number of turns ns of the secondary 3$b$ and that np of the primary 3$a$ can be ns/np=2/1.

One of the terminals of the secondary 3$b$ is connected to a node 4 to which a first saturable induction coil Lsat 1 and a first smoothing induction coil Llis1 are connected. The other terminal of the secondary 3$b$ is connected to a node 5 to which a second saturable induction coil Lsat2 and a second smoothing induction coil Llis2 are connected.

Between the saturable induction coils Lsat1 and Lsat2, two pairs of diodes are inserted. The first pair includes first and second power diodes D1 and D2 head to tail whereof the node 6 is connected to the positive output terminal 7+ of the conversion unit UCa, the cathodes of the power diodes D1 and D2 being connected together.

The other pair of diodes includes regulating diodes d1 and d2, also head to tail, the node 8 of which is connected to two control outputs 9 of a regulator 10 that is also part of the conversion unit UCa. The anodes of the regulating diodes d1 and d2 are connected together.

The regulator 10 is made up of two regulating blocks 10$a$ and 10$b$, one for the output voltage Vs and the other for the output current Is. The regulator 10 will be described in detail hereafter. It provides a control voltage −Vs that may depend on a regulating block 10$a$, when the output current Is is below a reference current considered to be the maximum admissible output current, or that may depend on the regulating block 10$b$ when the output voltage Vs is below a reference voltage, which indicates an overload. The two regulating blocks 10$a$ and 10$b$ therefore act on the same control voltage −Vc.

The smoothing induction coils Llis1 and Llis2 are connected together and their node 11 is connected to the negative output terminal 7− of the conversion unit UCa. A capacitor 12 is connected between the terminals 7+ and 7−, the same way that a capacitor 13 is connected between the output terminal 7− and the output terminals 9 of the regulator 10. The smoothing induction coils can have a tighter or looser mutual coupling M.

Figure 4:
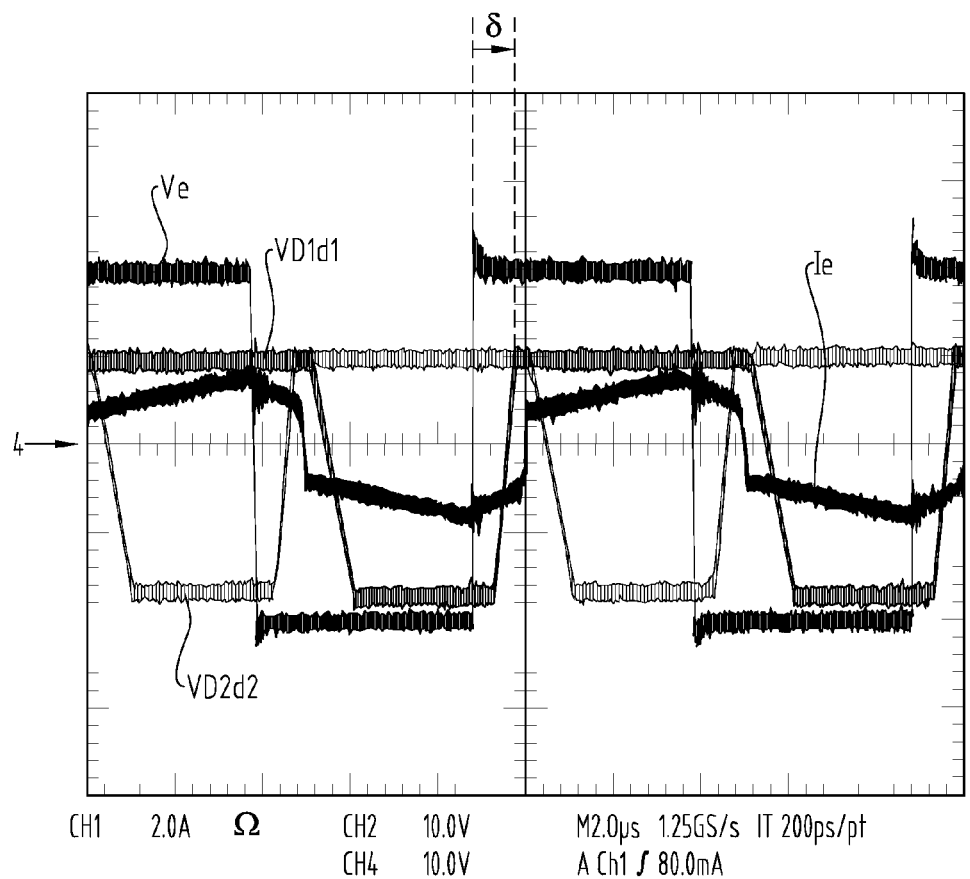
FIG. 4 is a diagram whereof the curves illustrate the operation of the conversion unit that is part of the converter shown in FIG. 3.

FIG. 4 shows, as an example, a diagram of the main signals present in the conversion unit UCa of FIG. 3 in the case of a conversion ratio ns/np=2/1 of the transducer 3. It shows two successive cycles of the conversion process in this example producing, as output (terminals 7+ and 7−), an output current Is of 1 A at an output voltage Vs=10 V. In this case, the input voltage Ve has an amplitude of 20 V on the primary 3 and the voltage on the secondary 3$b$ has an amplitude of 40 V. The control current Ic from the regulator 10 is then several mA at a voltage of −17 V. According to the invention, the control voltage Vc makes it possible, under these conditions, to maintain a phase shift δ between the input current Ie and the input voltage Ve so as to regulate the output voltage Vs. The diagram of FIG. 4 shows, as an example, these last parameters and the voltages respectively reigning on the node of the diodes D1, d1 on the one hand (VD1$d$1) and that of the diodes D2, d2 on the other hand (VD2$d$2). The curves of different shades of gray correspond to the different shades of gray of the arrows of FIG. 3. Of course, the aforementioned values of the voltages and currents are only provided as an example.

Figure 5:
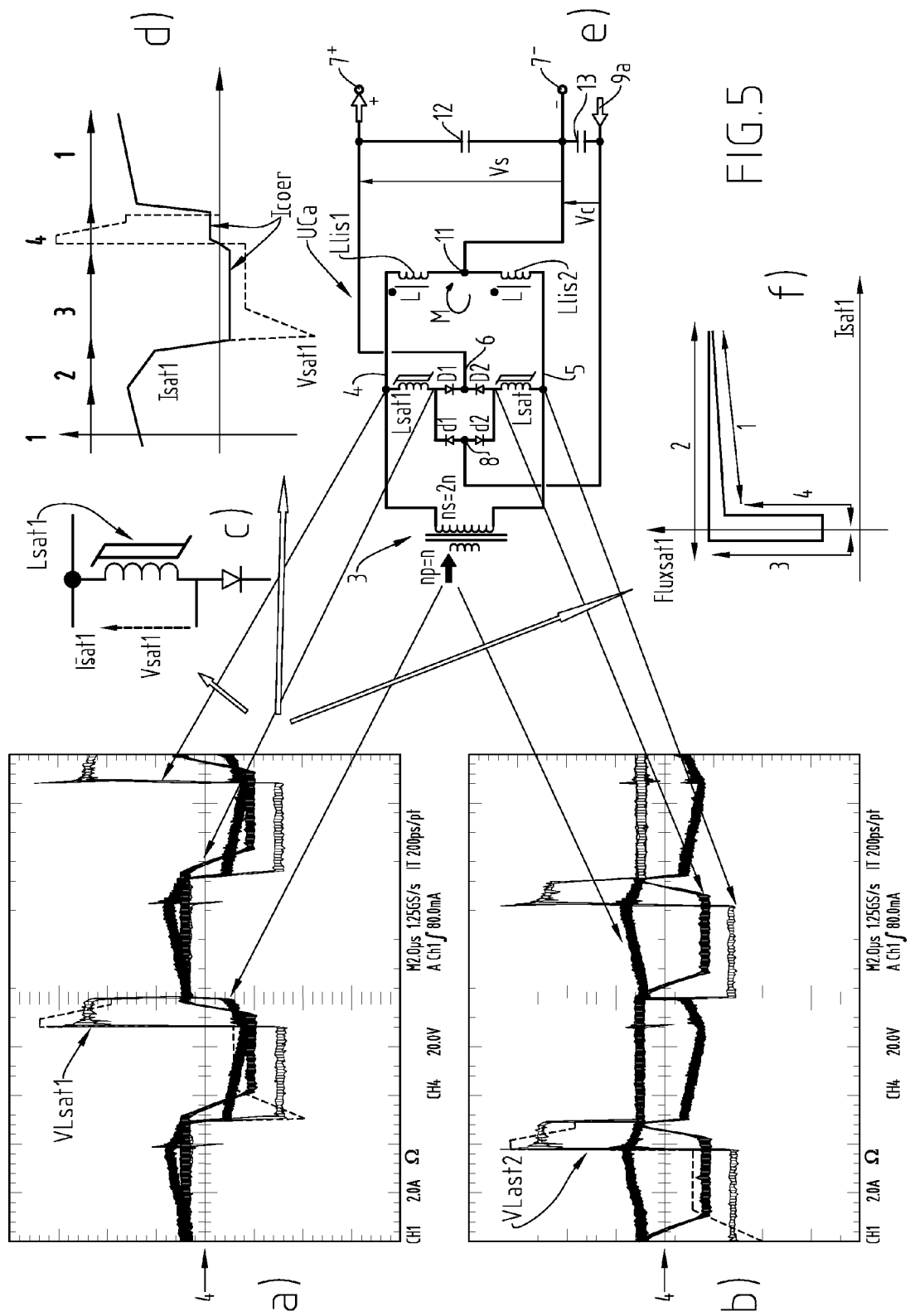
FIG. 5 shows, in sections a) to f) thereof, several other aspects of the operation of the conversion unit shown in FIG. 3.

FIG. 5 is intended to better explain the example of the conversion unit UCa shown and illustrated in FIGS. 3 and 4. This figure shows:

in a): the diagram of the curves as a function of time pertaining more particularly to the saturable induction coil Lsat1;

in b): the diagram of the curves as a function of time pertaining more particularly to the saturable induction coil Lsat2;

in c): the diagram of the saturable induction coil Lsat1 with its current Isat1 and the voltage Vsat1 at those terminals;

in d): the appearance of the current Isat1 as a function of the time during four phase 1 to 4 of an operating period of the conversion unit UCa; in e): a reminder of the diagram of FIG. 3 with reference by the arrows to the various concerned elements of FIG. 5; and in f): the theoretical hysteresis diagram of the saturable induction coil Lsat1 showing the evolution of its flow Fluxsat1 as a function of the current Isat1 during the four phases 1 to 4 of an operating cycle. It should be noted that FIG. 6 shows a real example of such a hysteresis diagram for a saturable induction coil usable in the invention.

Diagrams a) and b) of FIG. 5 show the appearance of the voltages VLsat1 and VLsat2 respectively present on nodes 4 and 5 of the circuit of the conversion unit UCa, the voltages VLsat1 VLsat2 also being shown respectively relative to their corresponding currents Isat1 and Isat2 respectively passing through the saturable induction coils Lsat1 and Lsat2 during an operating cycle.

The operation of this circuit is based on the observation that by neglecting the discharge time of the capacitances of the diodes D1, D2, d1 and d2, the value of the total flow present in the electromagnetic elements of the assembly (transducer 3, saturable induction coils Lsat1, Lsat2 and smoothing induction coils Llis1 and Llis2) must not vary for any moment of the cycle, from one cycle to another. In other words, the same value will be found for that flow at a given moment of the successive operating cycles. This implies that during each cycle, the positive area and the negative area of the voltages reigning at the nodes 4 and 5 are equal to one another, which is illustrated in diagram d) of FIG. 5 by the broken line. Furthermore, the output voltage Vs is directly related to the input voltage Ve by the value of the phase shift between the input voltage and the output voltage. Under these conditions, the output voltage Vs of the assembly is therefore directly regulated by the control voltage Vc from the regulator 10.

These conditions determine the phase shift and can be expressed as follows for a conversion of ratio 1 (np=ns). For a different conversion ratio, the term Ve will be multiplied by this ratio:

$$(1-\partial)*(V_e - V_s - V_c) = \partial * V_e$$

$$V_s = \frac{1}{2}*(1-2*\partial)*V_e$$

in which:

$\partial$ the phase shift between the input voltage Ve and the output voltage Vs expressed as angle ratio relative to 180°;

Ve voltage supplied by the secondary 3b of the transducer 3;

Vs output voltage on terminals 7+ and 7−;

Vc control voltage from the regulator 10.

As a result:

$$\partial = \frac{1}{2} - \frac{V_s}{V_e}$$

$$V_c = \frac{3/2 - V_s/V_e}{1/2 + V_s/V_e}*V_s$$

Under these conditions and still neglecting the capacity of the diodes:

for Vs=Ve/2 Vc=Vs=Ve/2 and phase shift=0
for Vs=0 Vc=0 and phase shift=90°.

In a real case, taking into account the discharge time for these capacitances, the relationship becomes more linear and not very dependent on Ve, as can be seen in the example of FIG. 7:

$$V_s \approx k*V_c \text{ with}$$

$$k \sim 10/17$$

This last relationship is illustrated by the curves of FIG. 7, which shows the relationship between Vc and Vs for a direct input voltage at the inverter of 30 V and 40 V respectively, with a constant output current Is of 4 A. (For information, given the conversion ratio, the voltage Ve is in this case from 15 to 20 V at the primary 3a and from 30 to 40 V at the secondary 3b).

FIG. 5d) also shows that the coercitive current Icoer of the saturable induction coils Lsat1 and Lsat2 circulating during phases 3 and 4 of the operating cycle has a relatively low value compared to the value of the current that circulates therein during the operating phases 1 and 2. As a result, it is possible to regulate the current with a very small amount of energy.

FIGS. 5f) and 6 respectively show the theoretical form and an example of a real form of the hysteresis cycle of the saturable induction coils Lsat1 and Lsat2.

FIGS. 4 to 6 thus make it possible to see that the method according to the invention ensures, during a first part of each of the cycles and under the effect of the saturation of the first saturable induction coil, the conduction of the first power diode associated with that induction coil and, during a second portion of each cycle and under the effect of the saturation of the second saturable induction coil, the conduction of the second power diode. Furthermore, the method makes it possible, during the first part of each cycle, to block the second power diode by conducting the first power diode and during a second part of each cycle, to block the first power diode by conducting the second power diode, ultimately resulting in the phase shift sought between the input voltage and the input current.

FIG. 8 respectively shows, in a) and b), examples of curves of the main parameters of one example of the conversion unit UCa according to the invention operating with a minimal power Pmin and a maximal power Pmax, these parameters respectively being the voltage Vlsat1/D1d1 on the node between the induction coil Lsat1 and the diodes D1 and d1, the voltage VLsat2/D2d2 on the node between the induction coil Lsat2 and the diodes D2 and d2, the input voltage Ve and the input current Ie, the curves being drawn with shades of gray decreasing in the indicated order going from black to light gray. The values of the output voltage Vs, the control voltage Vc, the output current Is and the control current Ic are indicated above the diagrams in the two cases of the powers Pmin and Pmax. One can see that the latter have a ratio of 1000 relative to one another.

Figure 9:
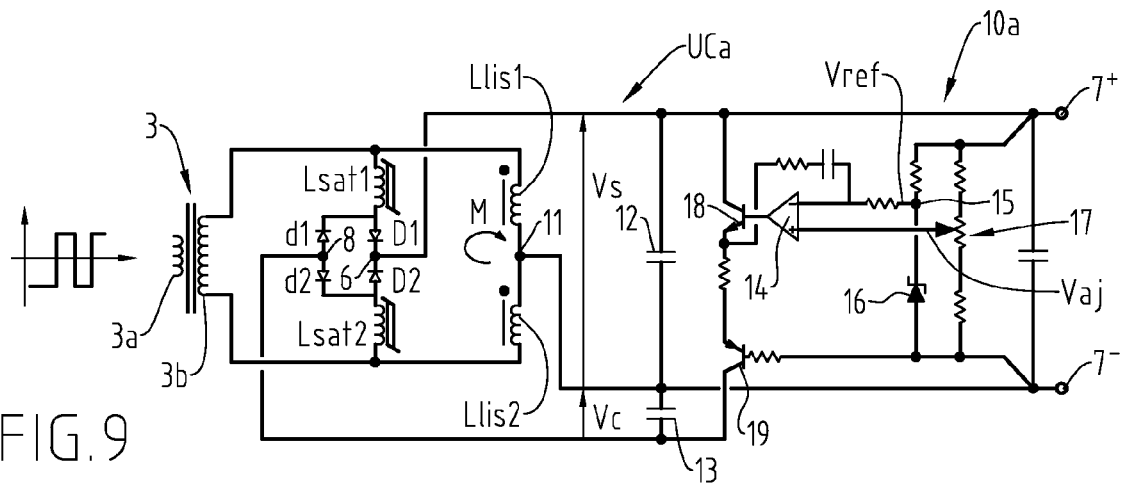
FIGS. 9 and 10 show two possible alternatives of the conversion unit based on the embodiment of FIG. 3 in the case of a voltage regulation.
Figure 10:
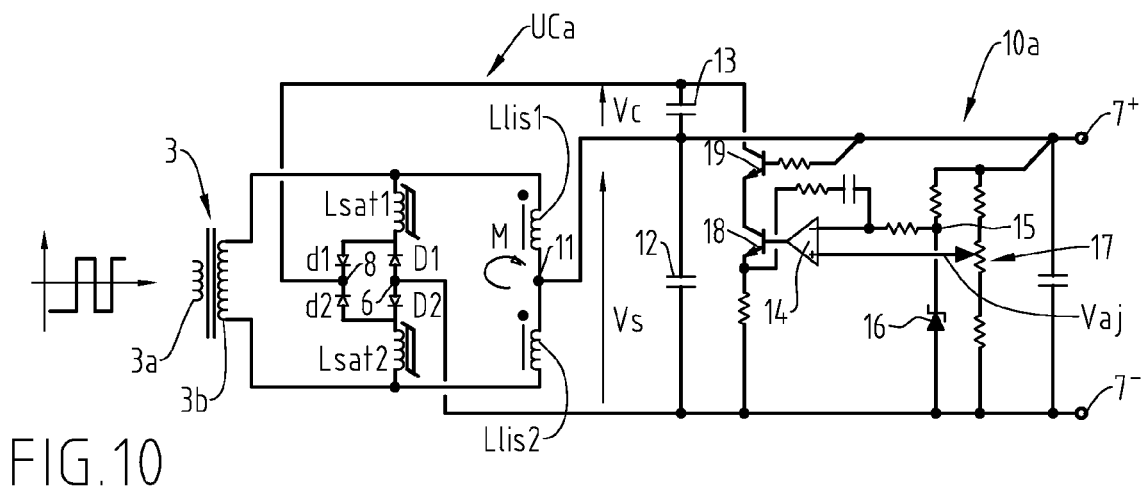

FIGS. 9 and 10 show two possible configurations of the conversion unit according to the invention, FIG. 9 showing that UCa shown in FIG. 3 and also including a more detailed diagram of a block 10a for regulating the voltage of the regulator 10.

This block 10a includes an operational amplifier 14 whereof the inputs respectively receive a voltage reference Vref established on a node 15 by a Zener diode 16, and an adjustment voltage Vaj coming from an adjustable voltage divider 17. The output of the amplifier 14 controls a transistor 18 setting, with another transistor in series 19, the control voltage Vc appearing on one of the terminals 9 of the regulator 10. In the case of FIG. 9, the control voltage Vc is referenced relative to the potential of the negative output terminal 7−. In that case, the current sent into the saturable induction coils Lsat1 and Lsat2 to reestablish their magnetic flow is positive (so-called "reset" current).

In the case of FIG. 10, on the other hand, which still relates to the alternative of the conversion unit UCa, the control voltage Vc is referenced relative to the potential of the positive output terminal 7+, the transistors 18 and 19 being connected accordingly. In this case, the reset current is negative.

It will be noted that the information relative to the output current Is may be obtained traditionally in the regulating block 10b so that the latter can develop the control voltage Vc.

However, this information can also be obtained simply by creating an image of said output current Is for example using the measuring circuit CMI shown in broken lines in FIG. 3.

This circuit includes two serial resistances R1 and R2 respectively connected to the terminals of the secondary 3b of the transducer 3. The shared node between the resistances R1 and R2 is connected on the one hand to a filtering capacitance C also connected to the terminal 7− of the conversion unit UCa and on the other hand to an input 91S of the regulating block 10b.

The image of the output current Is can be obtained in the regulating block 10b by averaging, over time, the two voltages prevailing at the terminals of the secondary 3b and referenced at the shared point (here the output terminal 7–) of the output Vs and control Vc voltages.

Figure 11:
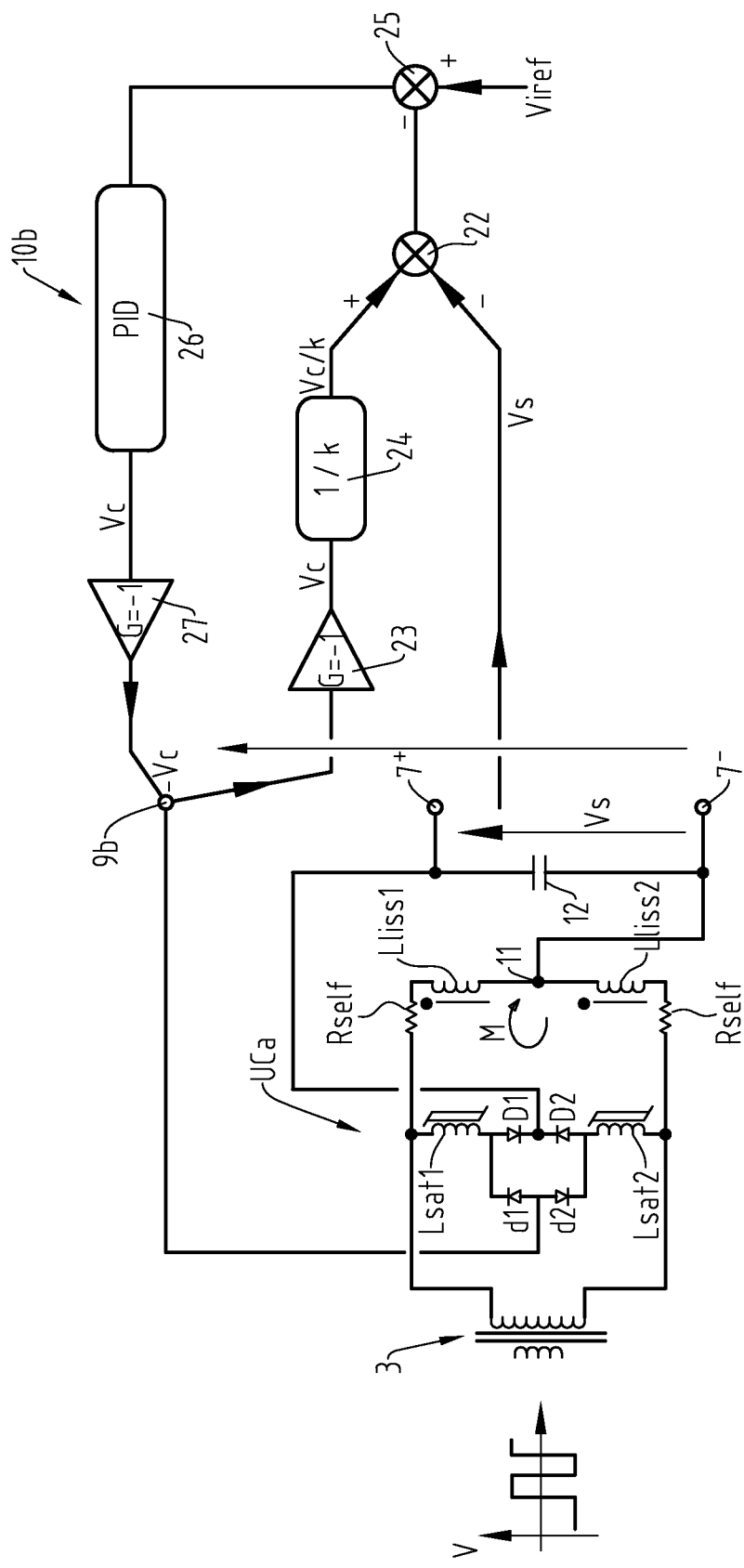
FIG. 11 shows an overview diagram of a converter of the type of FIG. 3 in the case of a current regulation.

FIG. 11 shows an overview diagram of a regulation of the output current Is done by the current regulating block 10b of the regulator 10 of FIG. 3, but only from the information on the control voltage Vc and the output voltage Vs.

In fact, in a real voltage doubling circuit of the type shown here in the figures, taking into account the resistances of the induction coils and the capacitances of the diodes, one can consider that $$\frac{V_e}{k} - V_s = \frac{R_{self} * I_s}{2}$$

wherein Rself represents the resistance of each of the smoothing induction coils Lliss1 and Lliss2, and wherein k is again a constant that takes the real behavior into account, in particular of the capacitances of the diodes, k in practice being able to be equal to 1.7 for a given type of diodes, as already indicated above.

It is possible to consider regulating the output current Is based on an estimator of the current of the type:

$$\varepsilon = \frac{V_c}{k} - V_s$$

wherein ε is an image voltage of the current then regulated by acting on Vc, but with the voltages Vs and Vc as the only information. The constant k is also set here as a function of the capacity of the diodes of the assembly and can be situated between 1 and 3, for example.

The diagram of FIG. 11 shows the principle of such a current regulation with a reference voltage Viref set at Rself*ls/2 and a value of k equal to 1.7.

In this FIG. 11, the diagram of FIG. 3 is shown together with an overview diagram of a current regulating block 10b that can implement the current regulating principle just described. The output voltage Vs of the conversion unit UCa is applied to the negative input of a summer 22 that receives, on its positive input, a value Vc/k, obtained from an inverter 23 receiving the negative value of the control voltage Vc, and a computation block 24 providing the inverse of the value k.

The output of the summer 22 is transmitted to the negative input of another summer 25, which receives, on its positive input, the value of the reference voltage Viref. Its output is connected to a PID regulator 26 developing the value Vc which, being reversed by a reverser 27, is applied to the converter.

Figure 12:
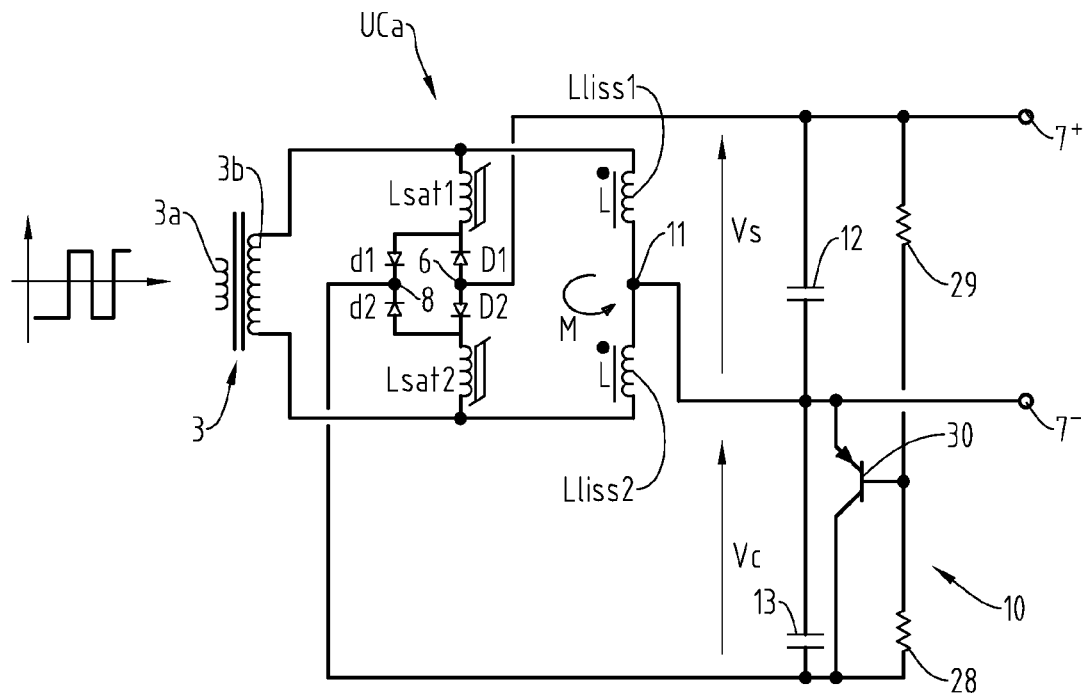
FIGS. 12 and 13 are diagrams of two alternatives of conversion units according to the invention with different current regulators.

FIG. 12 shows a very simplified practical embodiment of a current regulation based on the diagram of FIG. 11 and associated with the version of the conversion unit shown in FIG. 9.

A voltage divider made up of two resistances 28 and 29 performing the operations symbolized in 22, 23 and 24 in FIG. 11 applies a regulating voltage to a transistor 30 imposing the value of the control voltage Vc while thereby performing the operations symbolized in 26 and 27 in FIG. 11. Depending on the ratio k chosen for the current estimator, the resistances 28 and 29 are chosen such that the ratio of their values is equal to k, with R28/R29=k, k typically being able to be between 1 and 3. This embodiment has a limited regulation precision, as it depends on the threshold voltage of the transistor 30.

This embodiment constitutes a conversion unit that is limited in terms of current which can also be equipped with a voltage regulation like that shown in 10a in FIG. 3. The value of the current limitation corresponds to the relationship $$I_{smax} = \frac{4 * V_{sj}}{R_{self}}$$

wherein Ismax is the maximum output current of the conversion unit, Vsj is the threshold voltage of the transistor 30, and Rself is the resistance of the saturable induction coils Lsat1 and Lsat2 (not shown here).

Figure 13:
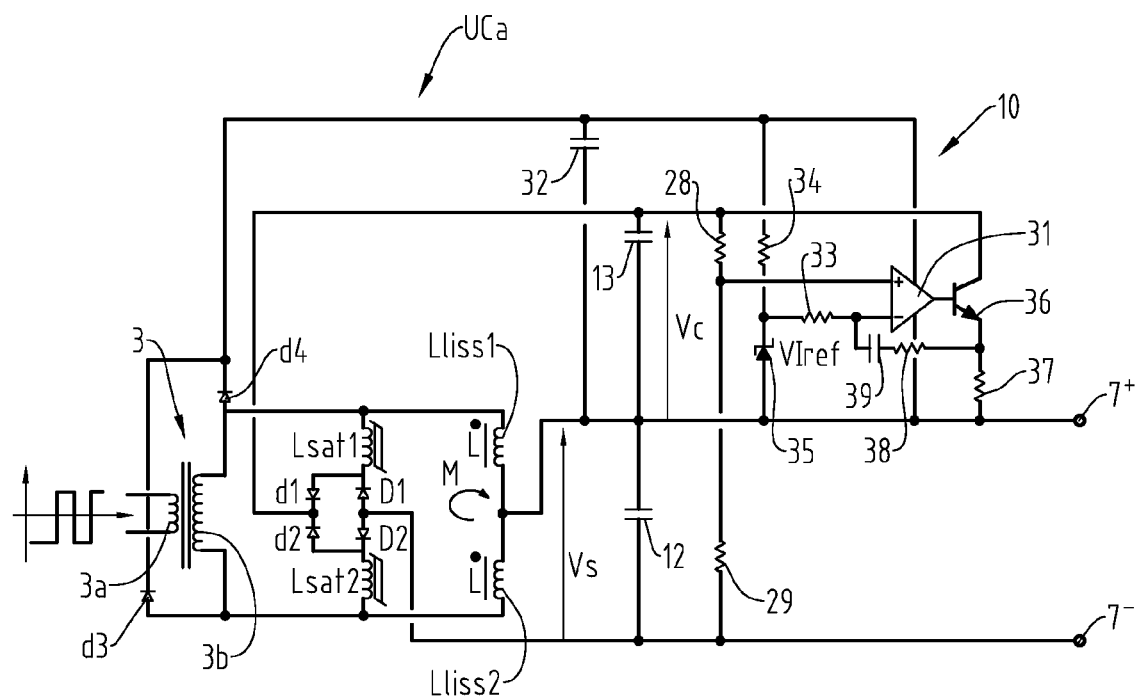

One preferred embodiment of a regulation combining that of the voltage and that of the current is shown in FIG. 13. It is still based on the regulation diagram of FIG. 11, but this time associated with the version of the conversion unit shown in FIG. 10. The regulator 10 of FIG. 13 includes an operational amplifier 31 powered from the secondary 3b of the transducer 3 through two diodes d3 and d4 and a smoothing capacitor 32. The non-reversing input of the amplifier 31 is connected to the voltage divider formed by the resistances 28 and 29 performing the operations 22, 23 and 24 of FIG. 11 identically relative to the diagram of FIG. 12. The reversing input of the amplifier 31 is connected through a resistance 33 to a node between a resistance 34 and a Zener diode 35 so as to receive a reference voltage Vref set owing to the latter.

The output of the amplifier 31 is connected to the base of a transistor 36 whereof the transmitter is connected on the one hand to the positive terminal 7+ of the converter by means of a resistance 37 and on the other hand to the reversing input of the operational amplifier 31 by means of a resistance 38 and a capacitor 39 together forming the PID term of the regulator 10.

FIG. 14 shows an alternative of a conversion unit UCb of the converter according to the invention, in which the smoothing induction coils are designed in a particular manner.

As shown in this figure, these smoothing induction coils, here respectively designated by references Lalis1 and Lali2, can be combined with the secondary of a transducer 40 also serving as input transducer as done by the transducer 3 of the preceding figures. The terminals 41a and 41b of the primary 41 of this transducer 40 are connected to an inverter, not shown here, while the secondary is provided with a winding with a middle point 42, each secondary portion 43 and 44 also forming one of the smoothing induction coils Lalis1 and Lalis2 whereof the terminals opposite the middle point 42 are respectively designated by references 43a and 44a. In that case, the secondary windings 43 and 44 of the transducer 40 have a weak coupling M relative to one another, but, on the other hand, a good coupling, M1 and M2, respectively, with the respective halves (not drawn differently here) of the primary winding 41, in return for which the converter has the same behavior as that of the embodiments already described, but with the additional interest of limiting the alternating component of the current that circulates in the serial circuit of the two smoothing induction coils Laliss1 and Laliss2 and therefore of limiting the current spikes in each of them.

Figure 15:
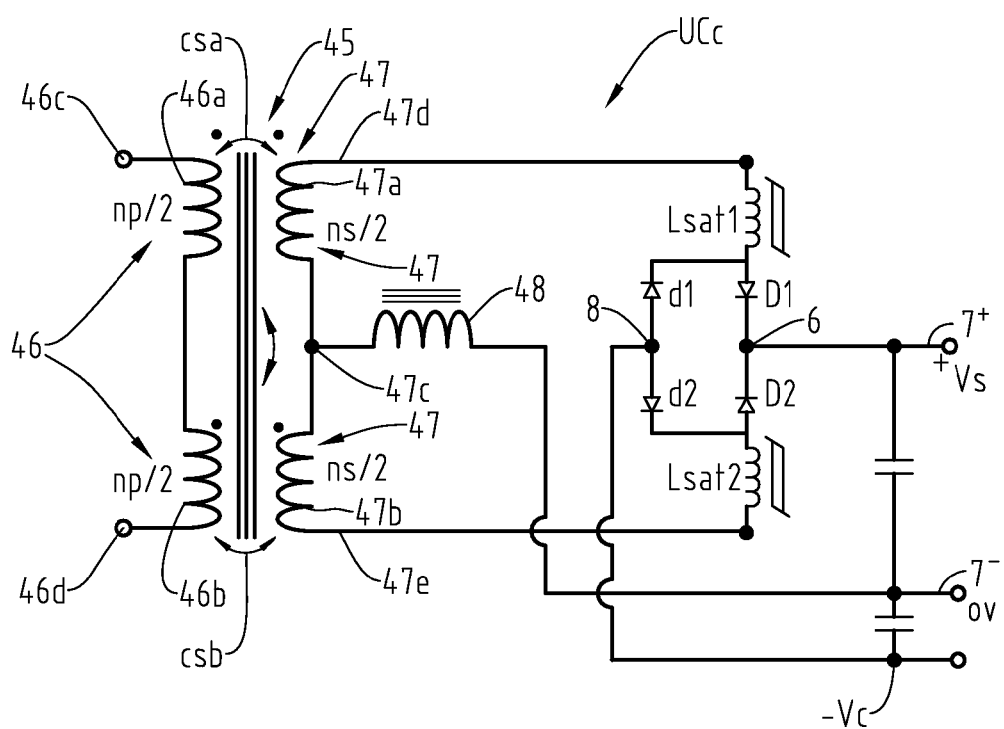
FIG. 15 shows a diagram of a conversion unit according to the invention in which a single smoothing induction coil and a transducer comprising two sets of half-windings are used, each set being formed by a primary half-winding and a secondary half-winding, the whole being wound on a shared core.

FIG. 15 shows another alternative of the conversion unit UCc including a transducer 45 whereof the primary 46 is divided into two half-windings 46a and 46b connected in series on the output of an inverter (not shown) by means of the terminals 46c and 46d. This transducer 45 also includes a secondary 47 also formed from two half-windings 47a and 47b connected in series. The pairs of half-windings 46a-47a and 46b-47b respectively have a tight coupling with one another, as indicated by the arrows csa and csb.

The pairs of half-windings thus form two separate sets, respectively 46a, 47a and 46b, 47b, located in different places on the magnetic circuit of the transducer 45.

The numbers of turns of the half-windings 46a and 46b are equal (they are each equal to np/2, with np the total number of turns of the primary 46), as are the numbers of turns of the half-windings 47a and 47b (they are equal to ns/2 each with ns the total number of turns of the secondary), the desired transformation ratio naturally determining the values of np and ns.

The middle point 47c of the secondary 47 is connected to a single smoothing induction coil 48 through which said node 47c is connected to the output terminal 7− of said assembly. The arrangement of the diodes D1, D2, d1 and d2 as well as that of the saturable induction coils Lsat1 and Lsat2 are identical to those of the preceding figures, the induction coils respectively being connected to the end terminals 47d and 47e of the half-windings 47a and 47b.

Of course and although not shown in FIGS. 14 and 15, the conversion units UCb and UCc of these figures can be connected to an inverter 2 and regulating blocks 10a and/or 10b in a manner similar to that illustrated in FIG. 3 relative to the conversion unit UCa.

FIGS. 16 to 19 show four possible alternative embodiments of the smoothing induction coils and/or transducers that can be used in the various conversion units UCa to UCc described so far.

Figure 16:
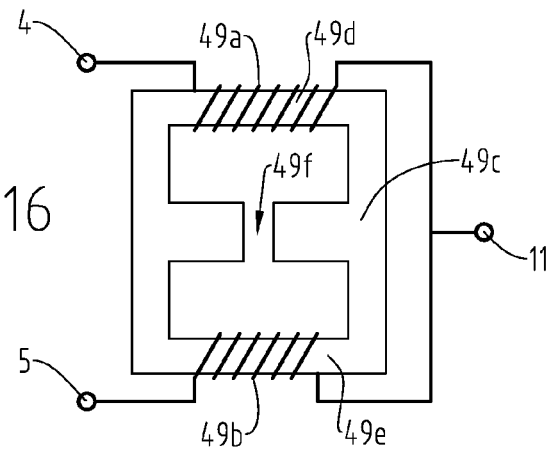
FIGS. 16 to 19 show possible construction alternatives of magnetic circuits for producing electromagnetic components used in the conversion units shown in FIGS. 3 to 15.

First, FIG. 16 shows one advantageous embodiment of the smoothing induction coils Llis1 and Llis2 that can be used in the conversion units UCa of FIGS. 3 and 9 to 13. In this case, the induction coils are formed from respective windings 49a, 49b wound on a shared core 49c made from a magnetic material. The core 49c is generally in the shape of two Es placed side by side by their outer branches 49d and 49e around which the windings 49a and 49b are respectively wound, their inner branches having a length such that an air gap 49f is formed between them. The windings 49a and 49b of this assembly are inserted into the unit UCa while being connected to the nodes 4, 5 and 11 as indicated in FIG. 16.

Figure 17:
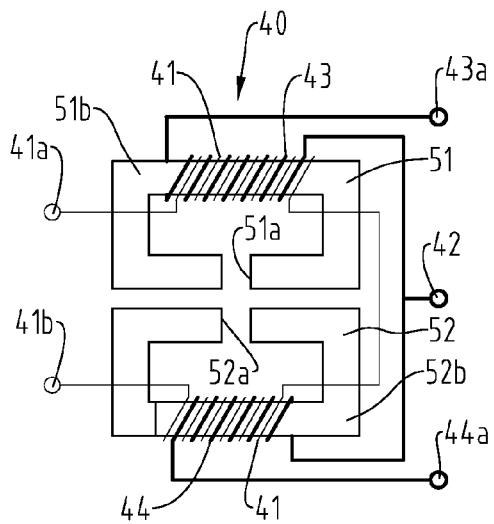
Figure 18:
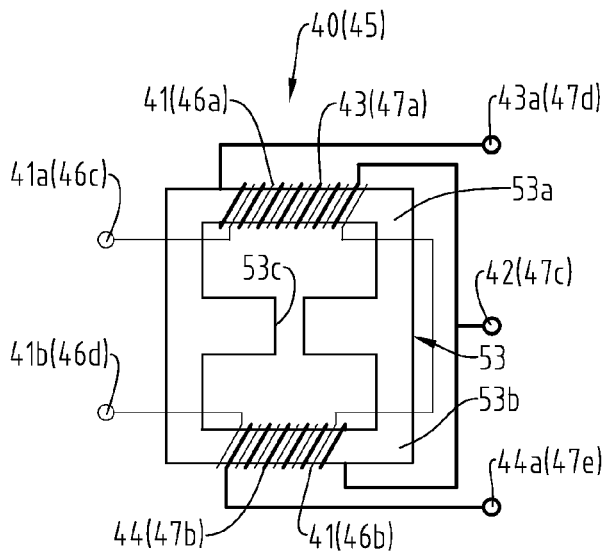
Figure 19:
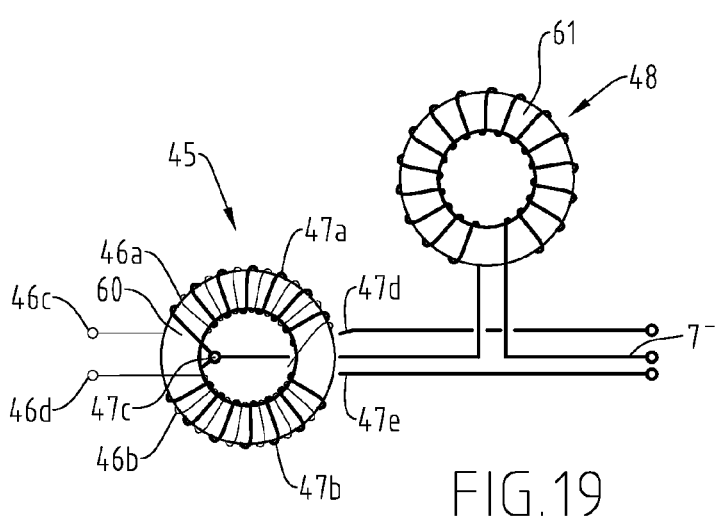

The alternatives shown in FIGS. 17 to 19 are intended to be used more particularly in the conversion units UCb and UCc of FIG. 14 or 15.

In the alternative of FIG. 17, which is more particularly intended to be used with the diagram of FIG. 14, the transducer 40 includes two distinct elementary magnetic circuits 51 and 52 made from a magnetic material and in the shape of a C, thereby forming air gaps 51a and 52a. The central branches 51b and 52b of these cores 51 and 52 each support two half-windings. Thus, the central branch 51b supports one half of the primary winding 41 connected in series with the other half of that winding wound on the central branch 52b, their terminals 41a and 41b being connected to the inverter. Each of these halves of the primary winding 41 is respectively coupled to one of the secondary half-windings 43 and 44. In that case, these half-windings act both as secondary half and smoothing induction coil Lalis1, Lalis2, respectively. FIG. 17 also shows the terminals 42 and 43a, 44a of these secondary half-windings 43 and 44.

In the alternative of FIG. 18, which is applicable both to the diagram of FIG. 14 and that of FIG. 15, the transducer 40 or 45 comprises a single-piece core 53 of the same shape as the core 49c of FIG. 16. If this arrangement is used to produce the transducer 40 of the assembly of FIG. 14, the outer branches 53a and 53b of this core 53 respectively support the two halves of the primary 41 with which the two half-windings 43 and 44 of the secondary of the transducer 40 are respectively wound together. The latter here also form both smoothing induction coils Lalis1 and Lalis2. Furthermore, the core 53 comprises an air gap 53c. It can also be noted that the section of the central branches delimiting the air gap 53c is equal to the sum of the sections of the outer branches 53a and 53b. FIG. 18 also indicates the references relative to the terminals of the various windings, as they are shown in FIG. 14.

Furthermore, in FIG. 18, the references pertaining to the elements making up the transducer 45 of FIG. 15 are shown in parentheses.

FIG. 19 shows one particularly advantageous embodiment of magnetic components that can be used in the conversion unit of FIG. 15.

In that case, the transducer 45 includes a ring-shaped magnetic circuit on which the respective pairs of half-windings 46a, 46b, 47a and 47b are wound, while the induction coil 48 includes a toroid 61 on which its winding it wound. Also in this case, a magnetic core should be provided with a strong permeability making it possible to decrease the magnetization current, therefore the losses, and on the other hand tight coupling between the windings of the primary and the secondary, as indicated in FIG. 15. In FIG. 19, the references of the various terminals of the windings are also provided.

All of the magnetic circuits of FIGS. 16 to 19 can be made in different ways. For example, it is possible to consider E-shaped cores with an I-shaped closing piece, a planar-type geometry of the core(s) and coils, ring shapes of the cores, and others. From the information provided above, the production of these alternative shapes of the electromagnetic elements is within the scope of the knowledge of those skilled in the art. The alternatives described above all aim to save iron in the production of magnetic circuits and/or to reduce the circulation current (direct component of the current) traveling through the smoothing induction coil(s) to a low value so as to decrease the current sizing and thereby decrease losses.

Figure 20:
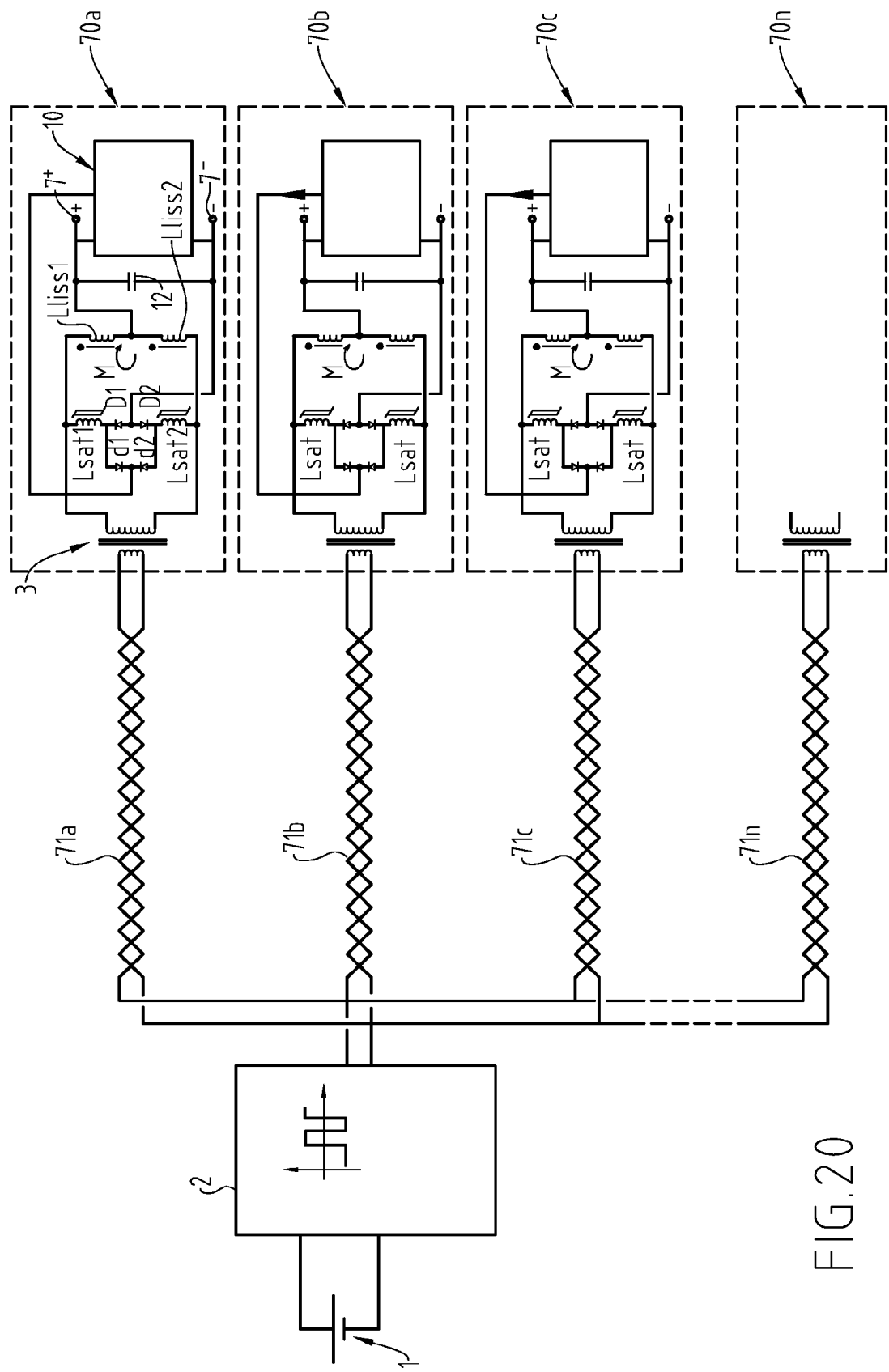
FIG. 20 shows an electricity distribution facility, in particular for telecommunications satellites, including a converter according to the invention with a plurality of conversion units of the type shown in particular in FIG. 3, the conversion units being connected individually to the inverter of the converter.

FIG. 20 shows a first example of an electricity distribution facility using a plurality of converters built according to any one of the alternatives described above, and more particularly and preferably that shown in FIG. 10.

This facility can advantageously be incorporated into a telecommunications satellite, for example, in which the conversion units 70a to 70n are provided as close as possible to the various energy consumers distributed in the satellite. In that case, all of the units 70a to 70n are powered by a shared DC source 1 such as the primary power bar, which may or may not be regulated, of the power sub-system of the satellite feeding into an inverter 2 also shared by all of the units. The latter are then connected in parallel to said inverter 2 using individual bifilar cables 71a to 71n.

FIG. 21 shows a second example of an electricity distribution facility of the type described above relative to FIG. 20. However, in this case, an inverter 2a is provided that converts the direct current from the source 1 into a three-phase current fed by said inverter into trifilar cables 73a to 73n connected to as many groups 74 of conversion units, whereof only that connected to the cable 73a is shown here. As in the case of FIG. 20, the conversion units can be built according to all alternatives of those previously described.

The groups of conversion units 74 here are of the three-phase type and therefore have three units each time, 75a, 75b and 75c, with individual input transducers, not shown, the primaries of which are connected in a star assembly as in this example or in a triangle assembly as in the example of FIG. 22. This last figure shows a circuit that is also identical to that of FIG. 21, the parts thereof situated upstream of the conversion units being omitted to simplify the drawing. In both cases, the DC outputs, provided on the terminals 76a and 76b of the conversion units 75a, 75b and 75c of each group 74, are connected in parallel. In that case, the control voltage Vc can be produced by a shared regulator 10 applying that voltage in parallel to the three units of the group by means of the terminals 77.

It will also be noted that the trifilar cables 73a to 73n are connected to the primaries of the transducers of the conversion units by means of capacitances 78 (not visible in FIG. 22) serving to offset the inductances of the cabling.

The diagram of FIG. 23 shows another alternative of the facility according to the invention, the figure here also only showing a single conversion group to simplify the drawing. As in the alternatives of FIGS. 21 and 22, the conversion units are assembled in groups 80 of three conversion units 81a, 81b and 81c each, with the understanding that as before, it is possible to provide a number n of identical groups distributed in the device to be powered (satellite, for example) as close as possible to its energy consumers. In the case at hand, however, each group 80 of conversion units includes a single polyphase input transducer 82 here comprising a three-phase primary 82a that can be connected in a star, as shown here, or in a triangle to the upstream portion (inverter and cabling, in particular) of the converter, as shown in FIGS. 21 and 22.

The transducer 82 comprises three independent secondaries 82b, 82c and 82d, not outlined here, respectively powering the assemblies of the three conversion units 81a, 81b and 81c according to the respective diagrams of the conversion units as previously described.

The DC outputs of the three units 81a, 81b and 81c of a group 80 are connected in parallel on the terminals 83a and 83b and the control voltage Vc created by a shared regulator 10 of the group is applied in parallel to the three units of the group 80.

As in the case of the elementary conversion units illustrated in FIG. 3, this regulator 10 can implement a current limitation or regulation, for example from an image of the output current Is. To that end, it is possible here to provide a measuring cell CMI. This circuit includes two serial resistances Ra to Rf per secondary 82b, 82c, 82d of the transducer 82. These resistances are connected to the respective secondaries by their terminals ca to cf, as indicated in FIG. 23, while their opposite terminals are connected together to a filtering capacitance C and a current-regulating input 91S of the regulator 10. The capacitance C is also connected to the output terminal 83b of the group. The alternating voltages thus collected are averaged in the regulator 10.

Drawing inspiration from the embodiment illustrated in FIG. 16 relative to a mono-phase embodiment of the smoothing induction coils, it is also possible according to another alternative embodiment, in cases of a three-phase embodiment of the groups of conversion units, to bring together the windings of all of the smoothing induction coils by sharing an air gap, as was done in FIG. 16 for the air gap 49f.

Such a magnetic circuit 90 is shown in diagrammatic perspective view in FIG. 24.

It comprises a magnetic piece 91 having a generally E-shaped profile with a rectangular base plate 92, from one of the surfaces of which extend outside posts 92a to 92f placed on the small edges of the plate. A central leg 92g also stands on said plate 92, extending over the entire width of the plate and midway between the posts 92a to 92f.

These all have an identical section, and they all have equal lengths slightly larger than that of the central leg 92g, the section of which is equal to the sum of the sections of the posts 92a to 92f. The magnetic piece 91 is completed by a flow closing plate 93 having the same dimensions as the base plate 91 and, if applicable, provided on the surface turned toward it of a central rib 94 centered on the central leg 92g that it completely covers and with which it defines a single air gap 95 (see FIGS. 25 and 27).

With the magnetic unit 91, it is possible to form several alternative embodiments, FIGS. 25 and 26 showing a first of these alternatives, with the understanding that FIG. 25 is a diagrammatic illustration of only two dimensions of the magnetic circuit aiming only to show the magnetic journeys. The figure therefore does not reflect the reality of the construction of the electromagnetic assembly.

In that case, each conversion group 100 includes an assembly 101 made up of three conversion units 102a, 102b and 102c, here called "overlapping," with the understanding that these three units are associated with a shared electromagnetic assembly 103 that forms the smoothing induction coils thereof using the magnetic circuit 90 shown in FIG. 24. The assembly 101 of this group 100 is powered by a single three-phase transducer 104. Several of these groups, such as the group 100, may make up an electricity facility, the transducers 104 then being able to be connected on a shared inverter or each on a separate inverter. The group provides a direct output voltage on the terminals 105a and 105b and is associated with a regulator 10 of the type previously described.

The magnetic unit 90 is shown in FIG. 26 associated with the "overlapping" conversion units 102a, 102b and 102c.

The secondaries of the transducer 104 are respectively connected to connections ca to cf that are also shown in FIG. 25. They are connected to winding ends 96a to 96f respectively wound on the posts 92a to 92f of the magnetic circuit 90 and each forming a smoothing induction coil belonging to the corresponding conversion units 102a, 102b and 102c. The winding direction of the windings 96a to 96f is such that the flows due to the DC components that travel through them pass through the air gap 95 in the same direction.

The advantage of a single magnetic unit used for all of the smoothing induction coils of a three-phase conversion group consists of a current, bulk and weight gain, which is particularly desirable in the environment of an artificial satellite.

Another alternative embodiment using a shared magnetic circuit such as 90 to form the smoothing induction coils integrated with the transducer is shown in FIG. 27. The diagram of this alternative is equivalent to a three-phase version of the mono-phase one shown in FIG. 14 in which a conversion unit includes an input transducer whereof the secondary also acts as smoothing induction coil.

In that case, at least one group 110 is provided of three conversion units 110a, 110b and 110c whereof the smoothing induction coils are formed by respective half-windings 111a, 111d; 111b, 111e; 111c, 111f respectively wound on the posts 92a, 92d; 92b, 92e; 92c, 92f of the magnetic circuit. These windings also form the secondaries of the transducer (here generally designated by reference 111) of the converter and they all have a shared middle point 112 (equivalent to the middle point 42 of FIG. 14) connected to the negative terminal 113b of the output of the converter, the positive terminal bearing reference 113a.

According to one particularly advantageous design of this alternative, around the posts 92a to 92f of the magnetic circuit, not only are half-windings 111a to 111f wound, but also respective half-windings 114a, 114d; 114b, 114e; 114c, 114f whereof the associated pairs are the corresponding portions of the primary of the transducer 111. The half-windings of these associated pairs are connected to one another by interconnects 115.

The transducer 111 of FIG. 27 thus built can be connected to a three-phase inverter (not shown here) in a triangle or star. By designating the external connections of the primaries of the transducer 111 with references ex1a, ex1b, ex2a, ex2b, ex3a and ex3b, a triangle assembly is obtained by connecting connections ex1a and ex3b to phase 1, connections ex2a and ex1b to phase 2, and connections ex3a and ex2b to phase 3. A star assembly is obtained by connecting connection ex1a to phase 1, connection ex2a to phase 2, connection ex3a to phase 3, and connections ex1b, ex2b and ex3b to the middle point.

All of the alternatives described above in the three-phase version can also be done in a polyphase version (i.e. more than three phases) by applying the concepts of the invention described above. One skilled in the art will be able to recognize such polyphase alternatives by adapting the three-phase versions described above accordingly.

The advantages of the three-phase or polyphase alternatives are significant.

First, for a same operating frequency, it is possible, in polyphase, to reduce the size of the filtering devices, given the increase in that case of the frequency of the residual inversion relative to that encountered in a monophase assembly, which is 2.f. This frequency of the residual inversion becomes 2.n.f, n being the number of conversion units in a polyphase group.

Furthermore, a polyphase design of the facility according to the invention makes it possible to increase the power thereof without increasing the unit power of the power components used, such as the diodes, the saturable induction coils and the smoothing induction coils. This results in a weight, bulk and cost reduction for a given overall power of the facility.

Lastly, a polyphase version has better fault tolerance, since a polyphase facility could still work, albeit in a downgraded mode, with one or more non-functional phases, but without preventing reduced operation of the energy consumers. This may represent a particular advantage in the context of a telecommunications satellite.

FIG. 28 shows one possible arrangement of the regulation of a converter according to the invention in which a non-regulated inverter 120 powers the primary winding 121 of a transducer 122 comprising three secondary windings 123a, 123b and 123c in monophase mode. The latter parts are respectively connected to three conversion units 124a, 124b and 124c designed according to the principle of FIG. 3, for example. In the case of FIG. 28, each of these conversion units is associated with its own regulator 125a, 125b and 125c that can be built like the regulator 10 of FIGS. 3 and 9, for example. An independent voltage reference Vrefa, Vrefb and Vrec, respectively, is applied to each of these regulators, providing a reference for a regulating loop symbolized here by the comparing elements 126 and the amplifiers 127. In this way, each conversion unit regulates its own output voltage as a function of the charge applied to it.

FIG. 29 shows another regulation example in which a converter according to the invention includes an inverter 130 that is regulated here. It powers the primary 131 of a transducer 132 having three secondaries 133a, 133b, 133c that are respectively connected to three conversion units 134a, 134b and 134c, the units 134b and 134c being made according to that shown in FIG. 3, for example. These conversion units are associated with regulators 135b and 135c designed like the regulators 125b to 125c of FIG. 28 using the diagram of FIG. 9, for example. These regulators receive the reference voltages Vrefb and Vrefc.

The conversion unit 134a is a simple current-doubling rectifier including power diodes D1 and D2 and smoothing induction coils Lliss1 and Lliss2. The output voltage Vsa of this conversion unit is compared to a reference voltage Vrefa in a comparing element 136 that creates a regulating signal for the regulated inverter 130 to which it is transmitted by means of a galvanic isolating device 137, such as an opto-coupler, for example, and an error amplifier 138 of the PID type, for example. The output of this amplifier thus forms the voltage reference for the inverter 130.

In the facility according to FIG. 29, the regulation controlling the inverter 130 is done as a function of the variations of the output voltage Vsa due for example to the variations of its charge. This regulation controls the operating rating of the inverter 130 so as to precisely determine the output voltage Vsa and "roughly," by "cross-regulation," the output voltages of the other conversion units. The regulators 135b and 135c perform a subtle regulation of the output voltages of the conversion units 134b and 134c.

The regulation solutions shown in FIGS. 28 and 29, also like those already described above, have the significant advantage of working without notable energy losses, as opposed to the traditional solutions, in which the output voltages of the converters are generally adjusted using dissipative ballasts.

The conversion method and the DC-DC converter according to the invention can advantageously be implemented in devices of the rotary transformer type and simply provide a direct power source regulated only by the elements located in the mobile portion. In spatial applications, such transformers can advantageously replace rotary brush collectors with contact, which remain subject to wear.

These rotary transformers are generally difficult to implement from a mechanical perspective. Using a converter according to the invention makes it possible to reduce these usage difficulties, since this converter only requires a single secondary winding, while ensuring a completely separate secondary regulation.

The DC-DC converter according to the invention can also be incorporated into contactless power transmission systems, and in particular into contactless battery charging systems, for example for electric vehicles. The primary of the converter is then incorporated into a stationary structure so that the secondary is connected to the battery to be recharged.

Due to its capacities to monitor the voltage delivered by the secondary, the converter according to the invention makes it possible to guarantee monitoring of the charge of the battery according to a reference voltage and current, irrespective of the voltage and current variations on the primary side.

Furthermore, it will be understood that the term "inverter" used in the preceding description generally encompasses any device capable of generating alternating voltage, and in one particular embodiment may designate an electric generator.

The converter according to the invention can advantageously be used in the aeronautics or wind energy fields.

The invention claimed is:

1. A method for converting electricity provided by an energy source delivering a first direct voltage and a first direct current having first respective values into output electricity at a second direct voltage and a second direct current having second respective values, comprising:
   a) subjecting the first direct current to an inversion operation to form a third alternating current at a third voltage, said third current at said third voltage being mono- or polyphase,
   b) changing, through a conversion operation, the value of said third voltage, or the value of each phase thereof, to obtain at least one converted voltage having said second value while simultaneously, the current at said converted voltage is rectified in at least one conversion unit while being subjected to magnetic switching using a first and a second saturable induction coils, c) said saturable induction coils being connected in a serial rectifying current made up of said first saturable induction coil, a first and a second head-to-tail power diodes and the second of the saturable induction coils, the first and second head-to-tail power diodes being shunted by a first and a second head-to-tail regulating diodes with rectification directions opposite those of the first and second head-to-tail power diodes, d) said serial circuit being connected to receive said converted voltage and to deliver said electricity in the form of at least part of said second direct current, e) regulating, during each cycle of the converted voltage, the moments of the magnetic switching by injecting, through said regulating diodes, a control voltage created as a function of the variations of said second voltage, f) controlling, for a first portion of each of said cycles, under the effect of the saturation of said first saturable induction coil, the conduction of said first power diode, and controlling, for a second portion of each concerned cycle, under the effect of the saturation of said second saturable induction coil, the conduction of said second power diode, the saturation moments being determined during that cycle as a function of said control voltage, and g) during said first portion of said cycle, blocking said second power diode by conducting said first power diode, and during said second portion of the considered cycle, blocking said first power diode by conducting said second power diode, so as to create a phase shift between said third voltage and said third current or between the voltage and the current of each phase thereof, the phase shift angle depending on said control voltage, and in that the method steps b), e), f) and g) are carried out, if applicable, for each phase of said third voltage.

2. The conversion method according to claim 1, further comprising smoothing said rectified current using at least one pair of smoothing induction coils in series connected on said converted voltage, said second voltage being taken from the node between said power diodes and the node between said smoothing induction coils of one pair.

3. A DC-DC converter for implementing the method according to claim 2, wherein it includes an inverter, a conversion unit and a regulator, said conversion unit including a transducer comprising a primary connected to said inverter and a secondary whereof the ends are connected to a serial circuit made up of a first saturable induction coil, two head-to-tail power diodes and a second saturable induction coil, the two power diodes being shunted by two head-to-tail regulating diodes with rectification directions opposite those of the two power diodes, said conversion unit also including a second serial circuit formed from two smoothing induction coils and connected in parallel to said secondary of said transducer, said second voltage being taken between the shared node of said power diodes and the shared node of said smoothing induction coils, and said control voltage produced by said regulator being applied between the shared node of said regulating diodes and the shared node of said smoothing induction coils.

4. The DC-DC converter according to claim 3, wherein said smoothing induction coils include a shared magnetic circuit on which their respective windings are wound, said magnetic circuit having an air gap associated in common with the two smoothing induction coils, said windings having a low coupling with one another ensured only through said magnetic circuit, the winding direction of the two windings being such that the flows they create in the magnetic circuit and which are due to the direct current components, pass through said air gap in the same direction.

5. The DC-DC converter according to claim 4, wherein the windings of said smoothing induction coils also make up the secondaries of said transducer, and in that each of these windings is wound together on said magnetic circuit tightly, with half of a winding of said transducer, said two winding halves forming the primary thereof.

6. The DC-DC converter according to claim 4, wherein said magnetic circuit is ring-shaped.

7. An electricity distribution facility, in particular for satellites, wherein it includes a plurality of converters according to claim 3, said inverter being shared by all of the converters.

8. An electricity distribution facility, in particular for satellites, wherein it includes at least one converter according to claim 3, built with a plurality of conversion units powered by a shared transducer, including a plurality of secondaries at a rate of one per unit.

9. The electricity distribution facility according to claim 8, wherein each of said conversion units is provided with its own regulator.

10. An electricity distribution facility, in particular for satellites, wherein, it includes at least one converter according to claim 3 built with a plurality of conversion units arranged in at least one group of conversion units powered by means of a shared transducer connected by its primary to said inverter and including as many secondaries as there are conversion units in a group, in that one of said conversion units of a group being able to be a pilot conversion unit formed by a mono-alternation rectifier with no phase shift means, in that said inverter is adjustable, in that the facility includes an adjustment loop acting on said inverter to adjust it as a function of the difference signal between a voltage reference signal and a signal depending on the output voltage of said pilot conversion unit, and in that the other conversion units of a group then being provided with their own regulator.

11. An electricity distribution facility, in particular for satellites, designed to implement the method according to claim 2, wherein it includes a polyphase inverter, a plurality of conversion units, said conversion units being distributed in at least one group of at least three units, and, associated with each group, a regulator for performing said regulating operation, in that for performing said conversion operation of said third voltage, the conversion units of one group of units are associated with a shared transducer with a polyphase primary and having as many secondaries as there are conversion units in the group, this transducer being connected to said inverter by means of a multi-line cable, in that said regulator applies the same control voltage to the units of a group, and in that in a group of conversion units, the outputs thereof are connected in parallel to provide, on two output terminals of that group, the sum of their individual output currents as second output current.

12. The electricity distribution facility, in particular for satellites, according to claim 11, wherein the smoothing induction coils belonging to the conversion units of a same group of conversion units can advantageously be grouped together on a shared magnetic circuit on which their respective windings are wound, this magnetic circuit having a single air gap, the coupling of these windings to one another being ensured only through said shared magnetic circuit, the winding direction of said windings being such that the flows due to the direct current components that pass through these windings pass through said air gap in the same direction.

13. The electricity distribution facility, in particular for satellites, according to claim 12, wherein in each group of conversion units, the smoothing induction coils grouped together on said shared magnetic circuit can respectively also serve as secondaries of said single transducer whereof the primary windings are respectively divided into two half-windings each coupled to one of the secondary windings also serving as smoothing induction coils for the conversion unit to which they are connected.

14. The conversion method according to claim 1, further comprising determining said control voltage as a function of said at least one portion of the second current.

15. The conversion method according to claim 14, wherein said control voltage is determined as a function of an image of said second current taken either from the filtered average of two voltages respectively taken between the terminals of said saturable induction coils opposite the terminals that are connected to said power diodes, and a reference point shared by the second voltage and said control voltage, in the monophase case, or from the set of filtered averages of these voltages in all of the phases, in the polyphase case.

16. The conversion method according to claim 14, wherein the determination of said control voltage is done from an image of said second current of form Vc/k-Vs, Vc being said third voltage, k being a constant comprised between 1 and 3.

17. A DC-DC converter for implementing the method according to claim 14, wherein it includes an inverter, a conversion unit and a regulator, said conversion unit including a transducer comprising a primary connected to said inverter and a secondary whereof the ends are connected to a first serial circuit made up of a first saturable induction coil, two head-to-tail power diodes and a second saturable induction coil, the two power diodes being shunted by two head-to-tail regulating diodes with rectification directions opposite those of the two power diodes, the secondary of said transducer being made up of two half-windings that have a weak magnetic coupling between them and which are coupled, preferably strongly, respectively each to half of the primary winding of said transducer, in return for which said half-windings respectively serve both as half-secondary for the conversion and smoothing induction coil, said second voltage being taken between the shared node of said power diodes and the shared node of said half-windings of said transducer, and said control voltage produced by said regulator being applied between the shared node of said regulating diodes and the shared node between said power diodes.

18. The DC-DC converter according to claim 17, wherein the primary of said transducer is wound on two distinct elementary magnetic circuits to form said two primary half-windings connected in series, each of these half-windings being strongly coupled together with a respective half-winding of the secondary of the transducer on an elementary magnetic circuit.

19. The DC-DC converter according to claim 18, wherein each of said elementary magnetic circuits is made in the shape of a C thereby forming an air gap, or in the form of a toroid.

20. A DC-DC converter for implementing the method according to claim 14, wherein it includes an inverter, a conversion unit and a regulator, said conversion unit including a transducer comprising a primary connected to said inverter and made up of two primary half-windings connected in series and a secondary made up of two half-windings also connected in series, the half-windings of the primary respectively forming, with the half-windings of the secondary, pairs each made up of a primary half-winding and a secondary half-winding that are closely coupled to one another, said primary being connected to said inverter and said secondary being connected to a serial circuit made up of a first saturable induction coil, two head-to-tail power diodes and a second saturable induction coil, the two power diodes being shunted by two head-to-tail regulating diodes with rectification directions opposite those of the two power diodes, said converter also including a single smoothing induction coil connected between the shared node of said secondary half-windings and an output terminal of said conversion unit supporting the negative potential of said second voltage, the output terminal of said unit supporting the positive potential thereof being connected to the shared node of said power diodes, and said control voltage produced by said regulator being applied between the shared node of said regulating diodes and said output terminal of the conversion unit supporting said negative potential.

21. The DC-DC converter according to claim 20, wherein said transducer includes a magnetic circuit on which two distinct sets of half-windings are wound, these sets being located in different places on said magnetic circuit and each made up of a primary half-winding and a secondary half-winding, the half-windings of each set being wound with a tight coupling.

22. The converter according to claim 20, wherein said single induction coil includes a ring-shaped magnetic circuit.

23. The conversion method according to claim 1, wherein said control voltage is referenced related to the positive potential of said second voltage.

24. The conversion method according to claim 1, wherein said control voltage is referenced related to the negative potential of said second voltage.

25. An electricity distribution facility, in particular for satellites, designed to implement the method according to claim 1, wherein it includes a polyphase inverter, a plurality of conversion units, said conversion units being distributed in at least one group of at least three units and, associated with each group, a regulator to perform said regulation operation, in that each conversion unit of a group of units includes a transducer to perform said conversion operation of said third voltage, the transducers of the units of a group being connected to said inverter by means of a multi-line cable, in that said regulator applies the same control voltage to the units of a group, and in that in a group of conversion units, the outlets thereof are connected in parallel to provide, on two output terminals of that group, the sum of their individual output currents as second output current.

26. The electricity distribution facility according to claim 25, wherein in each of said groups of conversion units, they can be connected in a triangle or star to said inverter.

* * * * *